United States Patent
Kang et al.

(10) Patent No.: US 12,527,818 B2
(45) Date of Patent: Jan. 20, 2026

(54) PLATINUM-BASED CHEMOTHERAPY, MAST BINDING AGENTS, GLUCOCORTICOID RECEPTOR (GR) BINDING AGENTS, AND/OR HSP90 BINDING AGENTS FOR USES IN TREATING CANCER

(71) Applicant: Emory University, Atlanta, GA (US)

(72) Inventors: Sumin Kang, Atlanta, GA (US); Jing Chen, Atlanta, GA (US)

(73) Assignee: Emory University, Atlanta, GA (US)

( * ) Notice: Subject to any disclaimer, the term of this patent is extended or adjusted under 35 U.S.C. 154(b) by 765 days.

(21) Appl. No.: 17/626,217

(22) PCT Filed: Jul. 10, 2020

(86) PCT No.: PCT/US2020/041592
§ 371 (c)(1),
(2) Date: Jan. 11, 2022

(87) PCT Pub. No.: WO2021/007512
PCT Pub. Date: Jan. 14, 2021

(65) Prior Publication Data
US 2022/0249545 A1    Aug. 11, 2022

Related U.S. Application Data

(60) Provisional application No. 62/873,049, filed on Jul. 11, 2019, provisional application No. 62/872,994, filed on Jul. 11, 2019.

(51) Int. Cl.
*A61K 33/243* (2019.01)
*A61K 31/395* (2006.01)
*A61K 31/555* (2006.01)
*A61K 45/06* (2006.01)
*A61P 35/00* (2006.01)

(52) U.S. Cl.
CPC .......... *A61K 33/243* (2019.01); *A61K 31/395* (2013.01); *A61K 31/555* (2013.01); *A61K 45/06* (2013.01); *A61P 35/00* (2018.01)

(58) Field of Classification Search
None
See application file for complete search history.

(56) References Cited

U.S. PATENT DOCUMENTS

| | | |
|---|---|---|
| 2,852,511 A | 9/1958 | Fried |
| 9,829,495 B2 | 11/2017 | Moraitis |
| 2009/0238880 A1 | 9/2009 | Ulm |
| 2011/0053879 A1 | 3/2011 | Martell |
| 2011/0118298 A1 | 5/2011 | Fritz |
| 2016/0303140 A1 | 10/2016 | Lee |
| 2018/0221345 A1 | 8/2018 | Proia |
| 2019/0008835 A1* | 1/2019 | Sundy ................ A61K 31/435 |
| 2020/0054635 A1* | 2/2020 | Campbell ............ A61K 31/496 |

FOREIGN PATENT DOCUMENTS

| | | | | |
|---|---|---|---|---|
| WO | 2019144012 | | 7/2019 | |
| WO | WO-2019222461 A1 * | 11/2019 | | ............ A61K 31/12 |

OTHER PUBLICATIONS

Berdel et al. Targeting Serum Glucocorticoid-Regulated Kinase-1 in Squamous Cell Carcinoma of the Head and Neck: A Novel Modality of Local Control, PLoS One, 2014, 9(12):e113795.
Chen et al. Dexamethasone enhances cell resistance to chemotherapy by increasing adhesion to extracellular matrix in human ovarian cancer cells, Endocrine-Related Cancer (2010) 17 39-50.
Jin et al. MAST1 drives cisplatin resistance in human cancers by rewiring cRaf independent MEK activation, Cancer Cell. 2018, 34(2): 315-330.e7.
Li et al. Dexamethasone induces docetaxel and cisplatin resistance partially through up-regulating Krüppel-like factor 5 in triplenegative breast cancer, Oncotarget, 2017, 8(7):11555-11565.
Meyer et al. Dexamethasone protects against cisplatin-induced activation of the mitochondrial apoptotic pathway in human osteosarcoma cells, Cancer Biology & Therapy, 2006, 5:8, 915-920.
Pan et al. Hsp90B enhances MAST1-mediated cisplatin resistance by protecting MAST1 from proteosomal degradation, J Clin Invest. 2019, 129(10):4110-4123.
Pan et al. Cisplatin-mediated activation of glucocorticoid receptor induces platinum resistance via MAST1, Nat Commun. 2021, 12(1):496.
Wolff et al. Dexamethasone Induces Partial Resistance to Cisplatinum in C6 Glioma Cells, Anticancer Res, 1996, 16(2):805-9.
Zheng et al., Contrary Regulation of Bladder Cancer Cell Proliferation and Invasion by Dexamethasone-Mediated Glucocorticoid Receptor Signals, Mol Cancer Ther, 2012, 11(12); 2621-32.
American Cancer Society (ACS), Lung Cancer Survival Rates, 2025, available at https://www.cancer.org/cancer/types/lung-cancer/detection-diagnosis-staging/survival-rates.html.
National Cancer Institute (NCI), Drugs Approved for Lung Cancer, 2025, available at https://www.cancer.gov/about-cancer/treatment/drugs/lung.

* cited by examiner

*Primary Examiner* — Nannette Holloman
(74) *Attorney, Agent, or Firm* — Emory Patent Group

(57) ABSTRACT

This disclosure relates to methods of treating cancer comprising administering an effective amount of a platinum-based chemotherapy agent in combination with a microtubule associated serine/threonine-protein kinase (MAST) inhibitor and/or a glucocorticoid receptor binding agent and/or a hsp90 binding agent and/or other chemotherapy agents disclosed herein to a subject in need thereof. In certain embodiments, this disclosure relates to pharmaceutical compositions comprising combinations of agents disclosed herein and a pharmaceutically acceptable excipient.

16 Claims, 6 Drawing Sheets

PLATINUM-BASED CHEMOTHERAPY, MAST BINDING AGENTS, GLUCOCORTICOID RECEPTOR (GR) BINDING AGENTS, AND/OR HSP90 BINDING AGENTS FOR USES IN TREATING CANCER

CROSS REFERENCE TO RELATED APPLICATIONS

This application is the National Stage of International Application No. PCT/US2020/041592 filed Jul. 10, 2020, which claims the benefit of U.S. Provisional Application No. 62/873,049 filed Jul. 11, 2019 and U.S. Provisional Application No. 62/872,994 filed Jul. 11, 2019. The entirety of each of these applications is hereby incorporated by reference for all purposes.

STATEMENT REGARDING FEDERALLY SPONSORED RESEARCH OR DEVELOPMENT

This invention was made with government support under CA207768 and CA175316 awarded by the National Institutes of Health and W81XWH-17-1-0186 awarded by the U.S. Army. The government has certain rights in the invention.

BACKGROUND

Platinum-based chemotherapy is employed for the treatment of a wide array of solid malignancies including head and neck, lung, and ovarian cancers. Cisplatin and other similar platinum-based drugs lead to an initial therapeutic success, but many patients have tumors that are resistant or develop resistance.

Protein kinases are often involved in pro-survival signaling pathways. The microtubule-associated serine/threonine-protein kinase 1 (MAST1, also known as SAST170) belongs to a family containing four members, MAST1-MAST4. MAST family members share approximately 49%-64% sequence homology and contain four distinct domains. MAST1 is reported to function as a scaffold protein to link the dystrophin/utrophin network with microfilaments via syntrophin. Recurrent rearrangement of the MAST1 gene has been observed in breast cancer cell lines and tissues.

Higher MEK1 expression in cancers is associated with platinum-based drug resistance and correlates with shortened progression-free survival of patients. Activation of the MAPK family of proteins has been implicated in response to platinum-based chemotherapy. For instance, inhibition of MEK/ERK signaling augmented cisplatin sensitivity in human squamous cell carcinoma. Although the importance of MEK in cancer and its contribution to chemotherapy response is reported, the detailed molecular mechanisms by which MEK is activated in response to platinum-based drug treatment, and how it consequently contributes to cisplatin response, is unclear. Thus, there is a need to identify improved therapeutic strategies.

Jin et al. report MAST1 drives cisplatin resistance in human cancers by rewiring cRaf-independent MEK activation. Cancer Cell. 2018, 34(2):315-330. See also WO2019144012.

Li et al. report dexamethasone induces docetaxel and cisplatin resistance partially through up-regulating krüppel-like factor 5 in triple-negative breast cancer. Oncotarget, 2017, 8(7):11555-11565.

References cited herein are not an admission of prior art.

SUMMARY

This disclosure relates to methods of treating cancer comprising administering an effective amount of a platinum-based chemotherapy agent in combination with a microtubule associated serine/threonine-protein kinase (MAST) inhibitor and/or a glucocorticoid receptor binding agent and/or a hsp90 binding agent and/or other chemotherapy agents disclosed herein to a subject in need thereof. In certain embodiments, this disclosure relates to pharmaceutical compositions comprising combinations of agents disclosed herein and a pharmaceutically acceptable excipient.

In certain embodiments, this disclosure relates to methods of treating cancer comprising administering an effective amount of a platinum-based chemotherapy agent in combination with a glucocorticoid receptor binding agent and a microtubule associated serine/threonine-protein kinase (MAST), e.g., MAST1, binding agent to a subject in need thereof. In certain embodiments, the glucocorticoid receptor binding agent is a glucocorticoid receptor agonist. In certain embodiments, the glucocorticoid receptor agonist is dexamethasone (9-fluoro-11,17-dihydroxy-17-(2-hydroxyacetyl)-10,13,16-trimethyl-6,7,8,9,10,11,12,13,14,15,16,17-dodecahydro-3H-cyclopenta [a]phenanthren-3-one), derivative, prodrug, or salt thereof. In certain embodiments, the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin. In certain embodiments, the microtubule associated serine/threonine-protein kinase (MAST) binding agent is lestaurtinib (6-hydroxy-6-(hydroxymethyl)-5-methyl-5,6,7,8,14,15-hexahydro-13H-16-oxa-4b,8a,14-triaza-5,8-methanodibenzo[b,h]cycloocta[jkl]cyclopenta[e]-as-indacen-13-one) or a derivative, prodrug, or salt thereof.

In certain embodiments, this disclosure relates to methods of treating cancer comprising administering an effective amount of a platinum-based chemotherapy agent in combination with a glucocorticoid receptor binding agent to a subject in need thereof. In certain embodiments, the glucocorticoid receptor binding agent is glucocorticoid receptor antagonist, derivative, prodrug, or salt thereof. In certain embodiments, the glucocorticoid receptor antagonist is mifepristone (11-(4-(dimethylamino)phenyl)-17-hydroxy-13-methyl-17-(prop-1-yn-1-yl)-1,2,6,7,8,11,12,13,14,15,16,17-dodecahydro-3H-cyclopenta[a]phenanthren-3-one), derivative, prodrug, or salt thereof. In certain embodiments, the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin. In certain embodiments, this disclosure relates to methods of treating cancer comprising administering an effective amount of a platinum-based chemotherapy agent in combination with dexamethasone and lestaurtinib to a subject in need thereof. In certain embodiments, this disclosure relates to methods of treating cancer comprising administering an effective amount of a platinum-based chemotherapy agent in combination with mifepristone and optionally lestaurtinib to a subject in need thereof.

In certain embodiments, this disclosure relates to methods of treating cancer comprising administering an effective amount of a platinum-based chemotherapy agent in combination with a hsp90 binding agent and a microtubule associated serine/threonine-protein kinase (MAST), e.g., MAST1, binding agent to a subject in need thereof. In certain embodiments, the hsp90 binding agent is tanespimycin (17-AAG or 19-(allylamino)-13-hydroxy-8,14-dimethoxy-4,10,12,16-tetramethyl-3,20,22-trioxo-2-azabicyclo [16.3.1]docosa-1(21),4,6,10,18-pentaen-9-yl carbamate), derivative, prodrug, or salt thereof. In certain embodiments, the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin. In certain embodiments, this disclosure relates to methods of treating cancer comprising administering an effective amount of a platinum-based chemotherapy agent in combination with tanespimycin and lestaurtinib to a subject in need thereof.

In certain embodiments, this disclosure relates to a combination of a microtubule associated serine/threonine-protein kinase (MAST) inhibitor and agents described herein in the production of a medicament for use in treating cancer.

In certain embodiments, this disclosure relates to pharmaceutical compositions comprising a microtubule associated serine/threonine-protein kinase (MAST) inhibitor and agents as described herein or combinations thereof and a pharmaceutically acceptable excipient. In certain embodiments, the MAST inhibitor is lestaurtinib and the agent is dexamethasone. In certain embodiments, the MAST inhibitor is lestaurtinib and the agent is mifepristone. In certain embodiments, the MAST inhibitor is lestaurtinib and the agent is tanespimycin.

In certain embodiments, the MAST inhibitor is a MAST specific binding agent such as an antibody, small molecule compound, peptide, or siRNA.

In certain embodiments, the glucocorticoid receptor binding agent is a glucocorticoid receptor agonist or antagonist which is an antibody, small molecule compound, peptide, or siRNA.

In certain embodiments, the hsp90 binding agent is an antibody, small molecule compound, peptide, or siRNA.

In certain embodiments, the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin.

DETAILED DESCRIPTION

Figure 1A:
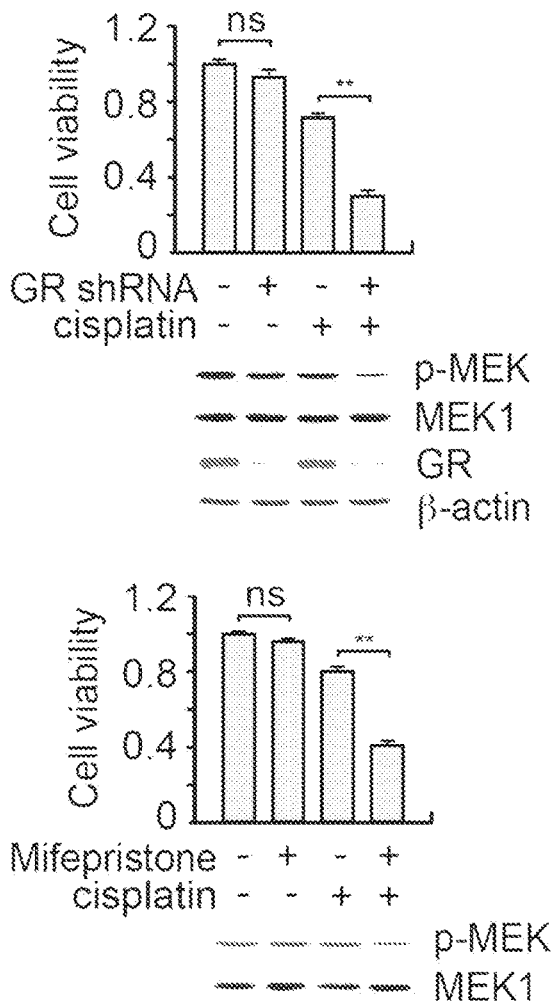
FIG. 1A shows data on how the modulation of glucocorticoid receptor (GR) results in MEK1 activity and cisplatin response change in KB-3-1 cells. Loss of GR sensitizes cells to cisplatin. GR was inhibited by shRNA (top) or by antagonist (bottom) in the presence or absence of cisplatin. Cell viability and MEK activity was measured by CellTiter-Glo™ Luminescent Cell Viability assay and p-MEK1 S217/S221 blot, respectively. Cisplatin: 1 µg/ml, Mifepristone: 10 µM.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent.

As used in this disclosure and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") have the meaning ascribed to them in U.S. Patent law in that they are inclusive or open-ended and do not exclude additional, unrecited elements or method steps. "Consisting essentially of" or "consists of" or the like, when applied to methods and compositions encompassed by the present disclosure refers to compositions like those disclosed herein that exclude certain prior art elements to provide an inventive feature of a claim, but which may contain additional composition components or method steps composition components or method steps, etc., that do not materially affect the basic and novel characteristic(s) of the compositions or methods, compared to those of the corresponding compositions or methods disclosed herein.

Reference to "MAST1" protein refers to the microtubule-associated serine/threonine-protein kinase 1 [*Homo sapiens*] with Genbank NCBI Reference Sequence: NP_055790.1. A MAST1 inhibitor refers to a specific binding agent for MAST1 that has the effect of decreasing kinase activity in vivo or in vitro. In certain embodiments, a MAST1 inhibitor is a small molecule compound selected from lestaurtinib, dovitinib, midostaurin, bosutinib, sunitinib, neratinib, staurosporine, ruxolitinib, SU14813, or combinations thereof. Davis et al. report analysis of kinase inhibitor selectivity. Nat Biotechnol. 2011, 29(11):1046-51. In certain embodiments, the small molecule compound is lestaurtinib (7-hydroxy-7-(hydroxymethyl)-8-methyl-5,6,7,8,13,14-hexahydro-15H-16-oxa-4b,8a,14-triaza-5,8-methanodibenzo[b,h]cycloocta[j kl]cyclopenta[e]-as-indacen-15-one) (CAS Registry Number 111358-88-4), prodrugs, derivatives, or salts thereof. In certain embodiments, the small molecule compound is dovitinib [4-amino-5-fluoro-3-(5-(4-methylpiperazin-1-yl)-1H-benzimidazol-2-yl)quinolin-2(1H)-one]), prodrugs, derivatives, or salts thereof. In certain embodiments, the small molecule compound is midostaurin [N-(10-methoxy-9-methyl-1-oxo-2,3,10,11,12,13-hexahydro-9,13-epoxy-1H, 9H-diindolo(1,2,3-GH:3',2',1'-1m)pyrrolo(3,4-j)(1,7)benzodiazonin-11-yl)-n-methylbenzamide]), prodrugs, derivatives, or salts thereof. In certain embodiments, the small molecule compound is bosutinib (4-[(2,4-Dichloro-5-methoxyphenyl)amino]-6-methoxy-7-[3-(4-methyl-1-piperazinyl)propoxy]-3-quinoline carbonitrile), prodrugs, derivatives, or salts thereof. In certain embodiments, the small molecule compound is sunitinib [5-(5-fluoro-2-oxo-1,2-di-hydroindolylidenemethyl)-2,4-dimethyl-1H-pyrrole-3-carboxylic acid (2-diethylaminoethyl)amide], prodrugs, derivatives, or salts thereof. In certain embodiments, the small molecule is neratinib [N-(4-(3-chloro-4-(2-pyridinyl-methoxy)anilino)-3-cyano-7-ethoxy-6-quinolyl)-4-(dimethylamino)-2-butenamide], prodrugs, derivatives, or salts thereof. In certain embodiments, the small molecule compound is staurosporine (6-methoxy-5-methyl-7-methyl-amino-6,7,8,9,15,16-hexahydro-5H,14H-5,9-epoxy-4b,9a, 15-triazadibenzo[b,h]cyclonona[1,2,3,4-j kl]cyclopenta[e]-as-indacen-14-one), prodrugs, derivatives, or salts thereof. In certain embodiments, the small molecule compound is ruxolitinib [3-(4-(7h-pyrrolo[2,3-d]pyrimidin-4-yl)-1h-pyrazol-1-yl)-3-cyclopentylpropanenitrile], prodrugs, derivatives, or salts thereof. In certain embodiments, the small molecule compound is SU14813 [5-((5-fluoro-2-oxo-1,2-dihydro-3H-indol-3-ylidene)methyl)-N-(2-hydroxy-3-morpholin-4-ylpropyl)-2,4-dimethyl-1H-pyrrole-3-carboxamide], prodrugs, derivatives, or salts thereof.

In certain embodiments, this disclosure relates to uses of a MAST1 inhibitor that is a specific binding agent to MAST1 such as an antibody that binds MAST1.

The term "antibody" herein is used in the broadest sense and specifically covers full length monoclonal antibodies, immunoglobulins, polyclonal antibodies, multi specific antibodies (e.g. bispecific antibodies) formed from at least two full length antibodies, e.g., each to a different antigen or epitope, and individual antigen binding fragments, including dAbs, scFv, Fab, F(ab)'2, Fab', including human, humanized and antibodies from non-human species and recombinant antigen binding forms such as monobodies and diabodies.

The term "human antibody" includes an antibody that possesses a sequence that is derived from a human germ-line immunoglobulin sequence, such as an antibody derived from transgenic mice having human immunoglobulin genes (e.g., XENOMOUSE genetically engineered mice (Abgenix, Fremont, Calif.), HUMAB-MOUSE™, KIRIN TC MOUSE™ transchromosome mice, KMMOUSE™ (MEDAREX, Princeton, N.J.)), human phage display libraries, human myeloma cells, or human B cells.

The term "monoclonal antibody" as used herein refers to an antibody obtained from a population of substantially homogeneous antibodies, i.e., the individual antibodies comprising the population are identical and/or bind the same epitope, except for possible variants that may arise during production of the monoclonal antibody, such variants generally being present in minor amounts. In contrast to polyclonal antibody preparations that typically include different antibodies directed against different determinants (epitopes), each monoclonal antibody is directed against a single determinant on the antigen. The modifier "monoclonal" indicates the character of the antibody as being obtained from a substantially homogeneous population of antibodies and is not to be construed as requiring production of the antibody by any particular method. For example, the monoclonal antibodies to be used in accordance with the present invention may be made by the hybridoma method first described by Kohler et al., Nature, 256:495 (1975), or may be made by recombinant DNA methods (see, e.g., U.S. Pat. No. 4,816, 567). The "monoclonal antibodies" may also be isolated from phage antibody libraries using the techniques described in Clackson et al., Nature, 352:624-628 (1991) and Marks et al. J. Mol. Biol., 222:581-597 (1991), for example.

The term "diabodies" refers to small antibody fragments with two antigen binding sites, which fragments comprise a variable heavy domain ($V_H$) connected to a variable light domain ($V_L$) in the same polypeptide chain ($V_H$-$V_L$). By using a linker that is too short to allow pairing between the two domains on the same chain, the domains are forced to pair with the complementary domains of another chain and create two antigen binding sites. Diabodies are described more fully in, for example, EP 404,097; WO 93/11161; and Hollinger et al., Proc. Natl. Acad. Sci. USA, 90:6444-6448 (1993).

A "full length antibody" is one which comprises an antigen binding variable region as well as a light chain constant domain (CO and heavy chain constant domains, $C_H1$, $C_H2$ and $C_H3$). The constant domains may be native sequence constant domains (e.g. human native sequence constant domains) or amino acid sequence variants thereof. In one aspect, the full-length antibody has one or more effector functions.

A "glycosylation variant" antibody herein is an antibody with one or more carbohydrate moieties attached thereto which differ from one or more carbohydrate moieties attached to a main species antibody. Examples of glycosylation variants herein include antibody with a G1 or G2 oligosaccharide structure, instead of a G0 oligosaccharide structure, attached to an Fc region thereof, antibody with one or two carbohydrate moieties attached to one or two light chains thereof, antibody with no carbohydrate attached to one or two heavy chains of the antibody, etc, and combinations of glycosylation alterations.

Antibody "effector functions" refer to those biological activities attributable to the Fc region (a native sequence Fc region or amino acid sequence variant Fc region) of an antibody. Examples of antibody effector functions include Clq binding; complement dependent cytotoxicity; Fc receptor binding; antibody-dependent cell-mediated cytotoxicity (ADCC); phagocytosis; down regulation of cell surface receptors (e.g. B cell receptor; BCR), and the like.

Depending on the amino acid sequence of the constant domain of their heavy chains, full length antibodies can be assigned to different "classes". There are five major classes of full length antibodies: IgA, IgD, IgE, IgG, and IgM, and several of these may be further divided into "subclasses" (isotypes), e.g., IgG1, IgG2, IgG3, IgG4, IgA, and IgA2. The heavy-chain constant domains that correspond to the different classes of antibodies are called alpha, delta, epsilon, gamma, and mu, respectively. The subunit structures and three-dimensional configurations of different classes of immunoglobulins are well known.

The "light chains" of antibodies from any vertebrate species can be assigned to one of two clearly distinct types, called kappa and lambda, based on the amino acid sequences of their constant domains.

"Humanized" forms of non-human (e.g., rodent) antibodies are chimeric antibodies that contain minimal sequence derived from non-human immunoglobulin. For the most part, humanized antibodies are human immunoglobulins (recipient antibody) in which residues from a hypervariable region of the recipient are replaced by residues from a hypervariable region of a non-human species (donor antibody) such as mouse, rat, rabbit or nonhuman primate having the desired specificity, affinity, and capacity. In some instances, framework region (FR) residues of the human immunoglobulin are replaced by corresponding non-human residues. Furthermore, humanized antibodies may comprise residues that are not found in the recipient antibody or in the donor antibody. These modifications are made to further refine antibody performance. In general, the humanized antibody will comprise substantially all of at least one, and typically two, variable domains, in which all or substantially all of the hypervariable loops correspond to those of a non-human immunoglobulin and all or substantially all of the FRs are those of a human immunoglobulin sequence. The humanized antibody optionally also will comprise at least a portion of an immunoglobulin constant region (Fc), typically that of a human immunoglobulin. For further details, see Jones et al., Nature 321:522-525 (1986); Riechmann et al., Nature 332:323-329 (1988); and Presta, Curr. Op. Struct. Biol. 2:593-596 (1992).

A specific "binding agent" may be a protein, peptide, nucleic acid, carbohydrate, lipid, or small molecular weight compound that specifically binds to a protein. In certain embodiments, the specific binding agent according to the present disclosure is an antibody or binding fragment thereof (e.g., Fab, F(ab')2), peptide or a peptibody, or binding fragments thereof. WO00/24782 and WO03/057134 (incorporated herein by reference) describe and teach making binding agents that contain a randomly generated peptide which binds a desired target. A specific binding agent can be a proteinaceous polymeric molecule (a "large molecule") such as an antibody or Fc-peptide fusion, or a non-proteinaceous non-polymeric molecule typically having a molecular weight of less than about 1200 Daltons (a "small molecule").

The term "specifically binds" refers to the ability of a specific binding agent of the present invention, under specific binding conditions, to bind a target molecule such that its affinity is at least 10 times as great, but optionally 50 times as great, 100, 250 or 500 times as great, or even at least 1000 times as great as the average affinity of the same specific binding agent to a large collection of random peptides or polypeptides. A specific binding agent need not bind exclusively to a single target molecule but may specifically bind to a non-target molecule due to similarity in structural conformation between the target and non-target (e.g., paralogs or orthologs). Those of skill will recognize that specific binding to a molecule having the same function in a different species of animal (i.e., ortholog) or to a molecule having a substantially similar epitope as the target molecule (e.g., a paralog) is within the scope of the term "specific binding" which is determined relative to a statistically valid sampling of unique non-targets (e.g., random polypeptides).

Glucocorticoid receptor binding agents included agonists or antagonist. Agonists, such as dexamethasone, prednisolone, and cortisol, are typically steroid derivatives with an ability to bind to the glucocorticoid receptor and repress the production of inflammatory mediators such as interleukin 6 and prostaglandin E2. Glucocorticoid receptor antagonists, such as mifepristone and progesterone, typically bind to glucocorticoid receptor and counteract the effects of agonists.

Hsp90 binding agents include inhibitors. As a chaperone, Hsp90 binds and stabilizes the folding confirmation of a variety of proteins including some required for survival of cancer cells. Hsp90 inhibitors such as tanespimycin (17-AAG), geldanamycin and radicicol bind to hsp90 and reduce interactions with these proteins.

The terms "neoplasm" and "tumor" are used herein interchangeably and refer to an abnormal mass of tissue wherein the growth of the mass surpasses and is not coordinated with the growth of a normal tissue. A neoplasm or tumor may be "benign" or "malignant," depending on the following characteristics: degree of cellular differentiation (including morphology and functionality), rate of growth, local invasion, and metastasis. A "benign neoplasm" is generally well differentiated, has characteristically slower growth than a malignant neoplasm, and remains localized to the site of origin. In addition, a benign neoplasm does not have the capacity to infiltrate, invade, or metastasize to distant sites. Exemplary benign neoplasms include, but are not limited to, lipoma, chondroma, adenomas, acrochordon, senile angiomas, seborrheic keratoses, and lentigos. In some cases, certain "benign" tumors may later give rise to malignant neoplasms, which may result from additional genetic changes in a subpopulation of the tumor's neoplastic cells, and these tumors are referred to as "pre-malignant neoplasms." An exemplary pre-malignant neoplasm is a teratoma. In contrast, a "malignant neoplasm" is generally poorly differentiated (anaplasia) and has characteristically rapid growth accompanied by progressive infiltration, invasion, and destruction of the surrounding tissue. Furthermore, a malignant neoplasm generally has the capacity to metastasize to distant sites.

As used herein, the term "cancer" refers to a malignant neoplasm (Stedman's Medical Dictionary, 25th ed.; Hensly ed.; Williams & Wilkins: Philadelphia, 1990). Exemplary cancers include, but are not limited to, acoustic neuroma; adenocarcinoma; adrenal gland cancer; anal cancer; angiosarcoma (e.g., lymphangiosarcoma, hemangiosarcoma); appendix cancer; benign monoclonal gammopathy; biliary cancer (e.g., cholangiocarcinoma); bladder cancer; breast cancer (e.g., adenocarcinoma of the breast, papillary carcinoma of the breast, mammary cancer, medullary carcinoma of the breast); brain cancer (e.g., meningioma, glioblastomas, glioma (e.g., astrocytoma, oligodendroglioma), medulloblastoma); bronchus cancer; carcinoid tumor; cervical cancer (e.g., cervical adenocarcinoma); choriocarcinoma; chordoma; craniopharyngioma; connective tissue cancer; epithelial carcinoma; ependymoma; endometrial cancer (e.g., uterine cancer, uterine sarcoma); esophageal cancer (e.g., adenocarcinoma of the esophagus, Barrett's adenocarcinoma); Ewing's sarcoma; eye cancer (e.g., intraocular melanoma, retinoblastoma); gall bladder cancer; gastric cancer (e.g., stomach adenocarcinoma); gastrointestinal stromal tumor (GIST); germ cell cancer; head and neck cancer (e.g., head and neck squamous cell carcinoma, oral cancer (e.g., oral squamous cell carcinoma), throat cancer (e.g., laryngeal cancer, pharyngeal cancer, nasopharyngeal cancer, oropharyngeal cancer)); hematopoietic cancers (e.g., leukemia such as acute lymphocytic leukemia (ALL) (e.g., B-cell ALL, T-cell ALL), acute myelocytic leukemia (AML) (e.g., B-cell AML, T-cell AML), chronic myelocytic leukemia (CIVIL) (e.g., B-cell CML, T-cell CIVIL), and chronic lymphocytic leukemia (CLL) (e.g., B-cell CLL, T-cell CLL)); lymphoma such as Hodgkin lymphoma (HL) (e.g., B-cell HL, T-cell HL) and non-Hodgkin lymphoma (NHL) (e.g., B-cell NHL such as diffuse large cell lymphoma (DLCL) (e.g., diffuse large B-cell lymphoma), follicular lymphoma, chronic lymphocytic leukemia/small lymphocytic lymphoma (CLL/SLL), mantle cell lymphoma (MCL), marginal zone B-cell lymphomas (e.g., mucosa-associated lymphoid tissue (MALT) lymphomas, nodal marginal zone B-cell lymphoma, splenic marginal zone B-cell lymphoma), primary mediastinal B-cell lymphoma, Burkitt lymphoma, lymphoplasmacytic lymphoma (i.e., Waldenstrom's macroglobulinemia), hairy cell leukemia (HCL), immunoblastic large cell lymphoma, precursor B-lymphoblastic lymphoma and primary central nervous system (CNS) lymphoma; and T-cell NHL such as precursor T-lymphoblastic lymphoma/leukemia, peripheral T-cell lymphoma (PTCL) (e.g., cutaneous T-cell lymphoma (CTCL) (e.g., mycosis fungoides, Sezary syndrome), angioimmunoblastic T-cell lymphoma, enteropathy type T-cell lymphoma, subcutaneous panniculitis-like T-cell lymphoma, and anaplastic large cell lymphoma); a mixture of one or more leukemia/lymphoma as described above; and multiple myeloma (MM)), heavy chain disease (e.g., alpha chain disease, gamma chain disease, mu chain disease); hemangioblastoma; hypopharynx cancer; kidney cancer (e.g., nephroblastoma a.k.a. Wilms' tumor, renal cell carcinoma); liver cancer (e.g., hepatocellular cancer (HCC), malignant hepatoma); lung cancer (e.g., bronchogenic carcinoma, small cell lung cancer (SCLC), non-small cell lung cancer (NSCLC), adenocarcinoma of the lung); leiomyosarcoma (LMS); muscle cancer; myelodysplastic syndrome (MDS); mesothelioma; myeloproliferative disorder (MPD) (e.g., polycythemia vera (PV), essential thrombocytosis (ET), myelofibrosis (MF), chronic idiopathic myelofibrosis, chronic myelocytic leukemia (CML), chronic neutrophilic leukemia (CNL)); neuroblastoma; neurofibroma (e.g., neurofibromatosis (NF) type 1 or type 2); neuroendocrine cancer, carcinoid tumor; osteosarcoma (e.g., bone cancer); ovarian cancer (e.g., cystadenocarcinoma, ovarian embryonal carcinoma, ovarian adenocarcinoma); papillary adenocarcinoma; pancreatic cancer (e.g., pancreatic adenocarcinoma, intraductal papillary mucinous neoplasm (IPMN), Islet cell tumors); penile cancer (e.g., Paget's disease of the penis and scrotum); pinealoma; primitive neuroectodermal tumor (PNT); plasma cell neoplasia; paraneoplastic syndromes; intraepithelial neoplasms; prostate cancer (e.g., prostate adenocarcinoma); rectal cancer; rhabdomyosarcoma; salivary gland cancer; skin cancer (e.g., squamous cell carcinoma (SCC), keratoacanthoma (KA), melanoma, basal cell carcinoma (BCC)); small bowel cancer (e.g., appendix cancer); soft tissue sarcoma (e.g., malignant fibrous histiocytoma (MFH), liposarcoma, malignant peripheral nerve sheath tumor (MPNST), chondrosarcoma, fibrosarcoma); sebaceous gland carcinoma; small intestine cancer; sweat gland carcinoma; testicular cancer (e.g., seminoma, testicular embryonal carcinoma); thyroid cancer (e.g., papillary carcinoma of the thyroid, papillary thyroid carcinoma (PTC), medullary thyroid cancer); urethral cancer; vaginal cancer; and vulvar cancer (e.g., Paget's disease of the vulva).

A "subject" to which administration is contemplated includes, but is not limited to, humans (i.e., a male or female of any age group, e.g., a pediatric subject (e.g., infant, child, adolescent) or adult subject (e.g., young adult, middle-aged adult, or senior adult)) and/or other non-human animals, for example, mammals. In certain embodiments, the subject is a human.

As used herein, the terms "treat" and "treating" are not limited to the case where the subject (e.g. patient) is cured and the disease is eradicated. Rather, embodiments of the present disclosure also contemplate treatment that merely reduces symptoms, and/or delays disease progression.

An "effective amount" refers to an amount sufficient to elicit the desired biological response, i.e., treating the condition. As will be appreciated by those of ordinary skill in this art, the effective amount may vary depending on such factors as the desired biological endpoint, the pharmacokinetics of the compound, the condition being treated, the mode of administration, and the age and health of the subject. An effective amount encompasses therapeutic and prophylactic treatment. For example, in treating cancer, an effective amount may reduce the tumor burden or stop the growth or spread of a tumor.

As used herein, the term "combination with" when used to describe administration with an additional treatment means that the agent may be administered prior to, together with, or after the additional treatment, or a combination thereof.

A "chemotherapy agent," "chemotherapeutic," "anti-cancer agent," or the like, refer to molecules that are recognized to aid in the treatment of a cancer. Contemplated examples include the following molecules or derivatives such as abemaciclib, abiraterone acetate, methotrexate, paclitaxel, adriamycin, acalabrutinib, brentuximab vedotin, ado-trastuzumab emtansine, aflibercept, afatinib, netupitant, palonosetron, imiquimod, aldesleukin, alectinib, alemtuzumab, pemetrexed disodium, copanlisib, melphalan, brigatinib, chlorambucil, amifostine, aminolevulinic acid, anastrozole, apalutamide, aprepitant, pamidronate disodium, exemestane, nelarabine, arsenic trioxide, ofatumumab, atezolizumab, bevacizumab, avelumab, axicabtagene ciloleucel, axitinib, azacitidine, carmustine, belinostat, bendamustine, inotuzumab ozogamicin, bevacizumab, bexarotene, bicalutamide, bleomycin, blinatumomab, bortezomib, bosutinib, brentuximab vedotin, brigatinib, busulfan, irinotecan, capecitabine, fluorouracil, carboplatin, carfilzomib, ceritinib, daunorubicin, cetuximab, cisplatin, cladribine, cyclophosphamide, clofarabine, cobimetinib, cab ozantinib-S-malate, dactinomycin, crizotinib, ifosfamide, ramucirumab, cytarabine, dabrafenib, dacarbazine, decitabine, daratumumab, dasatinib, defibrotide, degarelix, denileukin diftitox, denosumab, dexamethasone, dexrazoxane, dinutuximab, docetaxel, doxorubicin, durvalumab, rasburicase, epirubicin, elotuzumab, oxaliplatin, eltrombopag olamine, enasidenib, enzalutamide, eribulin, vismodegib, erlotinib, etoposide, everolimus, raloxifene, toremifene, panobinostat, fulvestrant, letrozole, filgrastim, fludarabine, flutamide, pralatrexate, obinutuzumab, gefitinib, gemcitabine, gemtuzumab ozogamicin, glucarpidase, goserelin, propranolol, trastuzumab, topotecan, palbociclib, ibritumomab tiuxetan, ibrutinib, ponatinib, idarubicin, idelalisib, imatinib, talimogene laherparepvec, ipilimumab, romidepsin, ixabepilone, ixazomib, ruxolitinib, cabazitaxel, palifermin, pembrolizumab, ribociclib, tisagenlecleucel, lanreotide, lapatinib, olaratumab, lenalidomide, lenvatinib, leucovorin, leuprolide, lomustine, trifluridine, olaparib, vincristine, procarbazine, mechlorethamine, megestrol, trametinib, temozolomide, methylnaltrexone bromide, midostaurin, mitomycin C, mitoxantrone, plerixafor, vinorelbine, necitumumab, neratinib, sorafenib, nilutamide, nilotinib, niraparib, nivolumab, tamoxifen, romiplostim, sonidegib, omacetaxine, pegaspargase, ondansetron, osimertinib, panitumumab, pazopanib, interferon alfa-2b, pertuzumab, pomalidomide, mercaptopurine, regorafenib, rituximab, rolapitant, rucaparib, siltuximab, sunitinib, thioguanine, temsirolimus, thalidomide, thiotepa, trabectedin, valrubicin, vandetanib, vinblastine, vemurafenib, vorinostat, zoledronic acid, or combinations thereof such as cyclophosphamide, methotrexate, 5-fluorouracil (CMF); doxorubicin, cyclophosphamide (AC); mustine, vincristine, procarbazine, prednisolone (MOPP); adriamycin, bleomycin, vinblastine, dacarbazine (ABVD); cyclophosphamide, doxorubicin, vincristine, prednisolone (CHOP); bleomycin, etoposide, cisplatin (BEP); epirubicin, cisplatin, 5-fluorouracil (ECF); epirubicin, cisplatin, capecitabine (ECX); methotrexate, vincristine, doxorubicin, cisplatin (MVAC).

The term "prodrug" refers to an agent that is converted into a biologically active form in vivo. Prodrugs are often useful because, in some situations, they may be easier to administer than the parent compound. They may, for instance, be bioavailable by oral administration whereas the parent compound is not. The prodrug may also have improved solubility in pharmaceutical compositions over the parent drug. A prodrug may be converted into the parent drug by various mechanisms, including enzymatic processes and metabolic hydrolysis. Typical prodrugs are pharmaceutically acceptable esters. Prodrugs include compounds wherein a hydroxy, amino or mercapto group is bonded to any group that, when the prodrug of the active compound is administered to a subject, cleaves to form a free hydroxy, free amino or free mercapto group, respectively. Examples of prodrugs include, but are not limited to, acetate, formate and benzoate derivatives of an alcohol or acetamide, formamide and benzamide derivatives of an amine functional group in the active compound and the like.

For example, if a disclosed compound or a pharmaceutically acceptable form of the compound contains a carboxylic acid functional group, a prodrug can comprise a pharmaceutically acceptable ester formed by the replacement of the hydrogen atom of the acid group with a group such as $(C_1-C_8)$alkyl, $(C_2-C_{12})$alkanoyloxymethyl, 1-(alkanoyloxy) ethyl having from 4 to 9 carbon atoms, 1-methyl-1-(alkanoyloxy)-ethyl having from 5 to 10 carbon atoms, alkoxycarbonyloxymethyl having from 3 to 6 carbon atoms, 1-(alkoxycarbonyloxy)ethyl having from 4 to 7 carbon atoms, 1-methyl-1-(alkoxycarbonyloxy)ethyl having from 5 to 8 carbon atoms, N-(alkoxycarbonyl)aminomethyl having from 3 to 9 carbon atoms, 1-(N-(alkoxycarbonyl)amino) ethyl having from 4 to 10 carbon atoms, 3-phthalidyl, 4-crotonolactonyl, gamma-butyrolacton-4-yl, di-N,N—$(C_1-C_2)$alkylamino$(C_2-C_3)$alkyl (such as beta-dimethylaminoethyl), carbamoyl-$(C_1-C_2)$alkyl, N,N-di$(C_1-C_2)$alkylcarbamoyl-$(C_1-C_2)$alkyl and piperidino-, pyrrolidino- or morpholino$(C_2-C_3)$alkyl.

If a disclosed compound or a pharmaceutically acceptable form of the compound contains an alcohol functional group, a prodrug can be formed by the replacement of the hydrogen atom of the alcohol group with a group such as $(C_1-C_6)$ alkanoyloxymethyl, 1-(($C_1-C_6$)alkanoyloxy) ethyl, 1-methyl-1(($C_1-C_6$)alkanoyloxy)ethyl $(C_1-C_6)$alkoxycarbonyloxymethyl, —N—$(C_1-C_6)$alkoxycarbonylaminomethyl, succinoyl, $(C_1-C_6)$alkanoyl, alpha-amino$(C_1-C_4)$alkanoyl, arylacyl and alpha-aminoacyl, or alpha-aminoacyl-alpha-aminoacyl, where each alpha-aminoacyl group is independently selected from naturally occurring L-amino acids $P(O)(OH)_2$, —$P(O)(O(C_1-C_6)$alkyl$)_2$, and glycosyl (the radical resulting from the removal of a hydroxyl group of the hemiacetal form of a carbohydrate).

If a disclosed compound or a pharmaceutically acceptable form of the compound incorporates an amine functional group, a prodrug can be formed by the replacement of a hydrogen atom in the amine group with a group such as R-carbonyl, RO-carbonyl, NRR'-carbonyl where R and R' are each independently $(C_1-C_{10})$alkyl, $(C_3-C_7)$cycloalkyl, benzyl, a natural alpha-aminoacyl, —C(OH)C(O)OY$_1$ wherein $Y^1$ is H, $(C_1-C_6)$alkyl or benzyl, —C(OY$_2$)Y$_3$ wherein Y$_2$ is $(C_1-C_4)$ alkyl and Y$_3$ is $(C_1-C_6)$alkyl, carboxy $(C_1-C_6)$alkyl, amino$(C_1-C_4)$alkyl or mono-N or di-N,N—$(C_1-C_6)$alkylaminoalkyl, —C(Y$_4$)Y$_5$ wherein Y$_4$ is H or methyl and Y$_5$ is mono-N— or di-N,N—$(C_1-C_6)$alkylamino, morpholino, piperidin-1-yl or pyrrolidin-1-yl.

As used herein, "pharmaceutically acceptable esters" include, but are not limited to, alkyl, alkenyl, alkynyl, aryl, arylalkyl, and cycloalkyl esters of acidic groups, including, but not limited to, carboxylic acids, phosphoric acids, phosphinic acids, sulfonic acids, sulfinic acids, and boronic acids.

As used herein, "pharmaceutically acceptable enol ethers" include, but are not limited to, derivatives of formula —C=C(OR) where R can be selected from alkyl, alkenyl, alkynyl, aryl, aralkyl, and cycloalkyl. Pharmaceutically acceptable enol esters include, but are not limited to, derivatives of formula —C=C(OC(O)R) where R can be selected from hydrogen, alkyl, alkenyl, alkynyl, aryl, aralkyl, and cycloalkyl.

As used herein, the term "derivative" refers to a structurally similar compound that retains sufficient functional attributes of the identified analogue. The derivative may be structurally similar because it is lacking one or more atoms, substituted, a salt, in different hydration/oxidation states, or because one or more atoms within the molecule are switched, such as, but not limited to, replacing a oxygen atom with a sulfur atom or replacing a amino group with a hydroxyl group. The derivative may be a prodrug. Derivatives may be prepare by any variety of synthetic methods or appropriate adaptations presented in synthetic or organic chemistry text books, such as those provide in March's Advanced Organic Chemistry: Reactions, Mechanisms, and Structure, Wiley, 6th Edition (2007) Michael B. Smith or Domino Reactions in Organic Synthesis, Wiley (2006) Lutz F. Tietze hereby incorporated by reference.

The term "substituted" refers to a molecule wherein at least one hydrogen atom is replaced with a substituent. When substituted, one or more of the groups are "substituents." The molecule may be multiply substituted. In the case of an oxo substituent ("=O"), two hydrogen atoms are replaced. Example substituents within this context may include halogen, hydroxy, alkyl, alkoxy, nitro, cyano, oxo, carbocyclyl, carbocycloalkyl, heterocarbocyclyl, heterocarbocycloalkyl, aryl, arylalkyl, heteroaryl, heteroarylalkyl, $-NR^aC(=O)R^b$, $-NR^aC(=O)NR^aNR^b$, $-NR^aC(=O)OR^b$, $-NR^aSO_2R^b$, $-C(=O)R_a$, $-C(=O)OR^a$, $-C(=O)NR^aR^b$, $-OC(=O)NR^aR^b$, $-OR^a$, $-SR^a$, $-SOR^a$, $-S(=O)_2R^a$, $-OS(=O)_2R^a$ and $-S(=O)_2OR^a$. $R^a$ and $R^b$ in this context may be the same or different and independently hydrogen, halogen hydroxyl, alkyl, alkoxy, alkyl, amino, alkylamino, dialkylamino, carbocyclyl, carbocycloalkyl, heterocarbocyclyl, heterocarbocycloalkyl, aryl, arylalkyl, heteroaryl, and heteroarylalkyl.

In certain embodiments, the MAST1 inhibitor is iRNA that targets MAST1 mRNA. In certain embodiments, the MAST1 inhibitor is shRNA designed to knock down gene expression. RNA interference initially discovered in plants as Post-Transcriptional Gene Silencing (PTGS), is a highly conserved mechanism triggered by double-stranded RNA (dsRNA) and able to down regulate transcript of genes homologous to the dsRNA. The dsRNA is first processed by Dicer into short duplexes of 21-23 nt, called short interfering RNAs (siRNAs). Incorporated in RNA-induced silencing complex (RISC), they are able to mediate gene silencing through cleavage of the target mRNA.

"siRNA" or "small-interfering ribonucleic acid" refers to two strands of ribonucleotides which hybridize along a complementary region under physiological conditions. The siRNA molecules comprise a double-stranded region that is substantially identical to a region of the mRNA of the target gene. A region with 100% identity to the corresponding sequence of the target gene is suitable. This state is referred to as "fully complementary". However, the region may also contain one, two or three mismatches as compared to the corresponding region of the target gene, depending on the length of the region of the mRNA that is targeted, and as such may be not fully complementary. Methods to analyze and identify siRNAs with sufficient sequence identity to inhibit expression of a specific target sequence are known in the art. A suitable mRNA target region would be the coding region. Also suitable are untranslated regions, such as the 5'-UTR, the 3'-UTR, and splice junctions as long as the regions are unique to the mRNA target and not directed to an mRNA poly A tail.

The length of the region of the siRNA complementary to the target, in accordance with the present disclosure, may be from 15 to 100 nucleotides, 18 to 25 nucleotides, 20 to 23 nucleotides, or more than 15, 16, 17 or 18 nucleotides. Where there are mismatches to the corresponding target region, the length of the complementary region is generally required to be somewhat longer. In certain embodiments, the RNA capable of RNA interference comprises a human MAST1 sequence of 18 to 25 nucleotides or greater than 15, 16, 17, or 18 nucleotides. *Homo sapiens* microtubule associated serine/threonine kinase 1 (MAST1), mRNA NCBI Reference Sequence isNM_014975.2, hereby incorporated by reference. Alternatively, spliced transcript variants encoding distinct isoforms have been found for this gene.

Xu et al. report enhancing tumor cell response to chemotherapy through nanoparticle-mediated co-delivery of siRNA and cisplatin prodrug. Proc Natl Acad Sci USA. 2013, 110(46): 18638-43.

He et al. report self-assembled nanoscale coordination polymers carrying siRNAs and cisplatin for effective treatment of resistant ovarian cancer. Biomaterials. 2015, 36:124-3.

Cho et al. report targeted delivery of siRNA-generating DNA nanocassettes using multifunctional nanoparticles. Small. 2013, 9(11):1964-73.

Since siRNA may be expressed from a RNA polymerase III (e.g., U6 or H1) promoter, a short hairpin siRNA (shRNA) gene may be cloned into expression vectors containing a polymerase III promoter to produce shRNAs from plasmid or viral vectors following transfecting into cells. See Brummelkamp et al., Science, 2002, 296, 550-553; Miyagishi & Taira, Nat. Biotechnol, 2002, 20, 497-500; McAnuff et al, J. Pharm. Sci. 2007, 96, 2922-2930; Bot et al., Blood, 2005, 106, 1147-1153. The shRNAs are further processed into siRNAs by a cellular endoribonuclease.

In certain embodiments, the disclosure relates to particles comprising a nucleic acid such as siRNA, DNA encoding for a siRNA, or siRNA expressing nanocassettes targeting MAST1. In certain embodiments, the disclosure relates to the particle further comprising a targeting ligand, e.g., shRNA, and a ligand that targets a receptor specifically expressed on tumor cells. In certain embodiments, the nanoparticles can be lipid particles, liposomes, lipoplexes, lipoids, polymers particles, cyclodextrin particles, Chitosan particles, polyethylene particles, gold particles, quantum dots (QDs) or iron oxide nanoparticles (IONPs). The particle may carry a chemotherapy drug. See Lee et al. Biomed Res Int. 2013, 2013:782041 entitled recent developments in nanoparticle-based siRNA delivery for cancer therapy.

Methods of Use

This disclosure relates to methods of treating cancer comprising administering an effective amount of a platinum-based chemotherapy agent in combination with a microtubule associated serine/threonine-protein kinase (MAST) inhibitor and/or a glucocorticoid receptor binding agent and/or a hsp90 binding agent and/or other chemotherapy agents disclosed herein to a subject in need thereof. In certain embodiments, this disclosure relates to pharmaceutical compositions comprising combinations of agents disclosed herein and a pharmaceutically acceptable excipient.

In certain embodiments, this disclosure relates to methods of treating cancer comprising administering an effective amount of a platinum-based chemotherapy agent in combination with a glucocorticoid receptor binding agent and a microtubule associated serine/threonine-protein kinase (MAST) binding agent, e.g., MAST1, to a subject in need thereof.

In certain embodiments, the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin.

In certain embodiments, the glucocorticoid receptor binding agent is dexamethasone, derivative, prodrug, or salt thereof.

In certain embodiments, the glucocorticoid receptor binding agent is mifepristone, derivative, prodrug, or salt thereof.

In certain embodiments, the microtubule associated serine/threonine-protein kinase (MAST) binding agent is lestaurtinib or a derivative, prodrug, or salt thereof.

In certain embodiments, this disclosure relates to methods of treating cancer comprising administering an effective amount of a platinum-based chemotherapy agent in combination with dexamethasone and lestaurtinib to a subject in need thereof.

In certain embodiments, this disclosure relates to methods of treating cancer comprising administering an effective amount of a platinum-based chemotherapy agent in combination with mifepristone and lestaurtinib to a subject in need thereof.

In certain embodiments, this disclosure relates to methods of treating cancer comprising administering an effective amount of a platinum-based chemotherapy agent in combination with a hsp90 binding agent and a microtubule associated serine/threonine-protein kinase (MAST) binding agent, e.g., MAST1, to a subject in need thereof.

In certain embodiments, the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin.

In certain embodiments, the hsp90 binding agent is tanespimycin, herbimycin A, geldanamycin, derivative, prodrug, or salt thereof.

In certain embodiments, this disclosure relates to methods of treating cancer comprising administering an effective amount of a platinum-based chemotherapy agent in combination with tanespimycin and lestaurtinib to a subject in need thereof.

In certain embodiments, the MAST1 inhibitor is a MAST1 specific binding agent such as an antibody, small molecule compound, peptide, or siRNA.

In certain embodiments, the methods disclosed herein further comprise administering an additional anti-cancer agent or alternative chemotherapy.

In certain embodiments, the methods disclosed herein further comprise administering an additional anti-cancer agent such as anti-CTLA4 (e.g., ipilimumab, tremelimumab) antibodies and/or the anti-PD1/PD-L1 (e.g., nivolumab, pidilizumab, pembrolizumab, atezolizumab, avelumab, durvalumab) antibodies.

In certain embodiments, the methods disclosed herein contemplate the subject is administered a combination of microtubule associated serine/threonine-protein kinase 1 (MAST1) inhibitor, dexamethasone, a taxane, and a platinum-based chemotherapy agent. In certain embodiments, the taxane is paclitaxel, taxol, docetaxel, or combinations thereof. In certain embodiments, the subject is administered a combination of lestaurtinib, dexamethasone, paclitaxel, and cisplatin.

In certain embodiments, the methods disclosed herein contemplate the subject is administered a combination of microtubule associated serine/threonine-protein kinase 1 (MAST1) inhibitor, dexamethasone, bleomycin, etoposide, and a platinum-based chemotherapy agent.

In certain embodiments, the subject is administered a combination of lestaurtinib, dexamethasone, bleomycin, etoposide, and cisplatin.

In certain embodiments, the methods disclosed herein contemplate the subject is administered a combination of microtubule associated serine/threonine-protein kinase 1 (MAST1) inhibitor, dexamethasone, a taxane, and a platinum-based chemotherapy agent. In certain embodiments, the taxane is paclitaxel, taxol, docetaxel, or combinations thereof. In certain embodiments, the subject is administered a combination of lestaurtinib, dexamethasone, paclitaxel, and cisplatin.

In certain embodiments, the methods disclosed herein contemplate the subject is administered a combination of microtubule associated serine/threonine-protein kinase 1 (MAST1) inhibitor, dexamethasone, bleomycin, etoposide, and a platinum-based chemotherapy agent.

In certain embodiments, the subject is administered a combination of lestaurtinib, dexamethasone, bleomycin, etoposide, and cisplatin.

In certain embodiments, the methods disclosed herein contemplate the subject is administered a combination of microtubule associated serine/threonine-protein kinase 1 (MAST1) inhibitor, dexamethasone, epirubicin, 5-fluorouracil and a platinum-based chemotherapy agent.

In certain embodiments, the subject is administered a combination of lestaurtinib, dexamethasone, epirubicin, 5-fluorouracil, and cisplatin. In certain embodiments, the subject is administered a combination of lestaurtinib and cisplatin.

In certain embodiments, the methods disclosed herein contemplate the subject is administered a combination of microtubule associated serine/threonine-protein kinase 1 (MAST1) inhibitor, dexamethasone, epirubicin, capecitabine, and a platinum-based chemotherapy agent. In certain embodiments, the subject is administered a combination of lestaurtinib, dexamethasone, epirubicin, capecitabine, and cisplatin.

In certain embodiments, the methods disclosed herein contemplate the subject is administered a combination of microtubule associated serine/threonine-protein kinase 1 (MAST1) inhibitor, dexamethasone, methotrexate, vincristine, doxorubicin, and a platinum-based chemotherapy agent. In certain embodiments, the subject is administered a combination of lestaurtinib, dexamethasone, methotrexate, vincristine, doxorubicin, and cisplatin.

In certain embodiments, the methods disclosed herein contemplate the subject is administered a combination of microtubule associated serine/threonine-protein kinase 1 (MAST1) inhibitor, tanespimycin, a taxane, and a platinum-based chemotherapy agent. In certain embodiments, the taxane is paclitaxel, taxol, docetaxel, or combinations thereof. In certain embodiments, the subject is administered a combination of lestaurtinib, tanespimycin, paclitaxel, and cisplatin.

In certain embodiments, the methods disclosed herein contemplate the subject is administered a combination of microtubule associated serine/threonine-protein kinase 1 (MAST1) inhibitor, tanespimycin, bleomycin, etoposide, and a platinum-based chemotherapy agent.

In certain embodiments, the subject is administered a combination of lestaurtinib, tanespimycin, bleomycin, etoposide, and cisplatin.

In certain embodiments, the methods disclosed herein contemplate the subject is administered a combination of microtubule associated serine/threonine-protein kinase 1 (MAST1) inhibitor, tanespimycin, a taxane, and a platinum-based chemotherapy agent. In certain embodiments, the taxane is paclitaxel, taxol, docetaxel, or combinations thereof. In certain embodiments, the subject is administered a combination of lestaurtinib, tanespimycin, paclitaxel, and cisplatin.

In certain embodiments, the methods disclosed herein contemplate the subject is administered a combination of microtubule associated serine/threonine-protein kinase 1 (MAST1) inhibitor, tanespimycin, bleomycin, etoposide, and a platinum-based chemotherapy agent.

In certain embodiments, the subject is administered a combination of lestaurtinib, tanespimycin, bleomycin, etoposide, and cisplatin.

In certain embodiments, the methods disclosed herein contemplate the subject is administered a combination of microtubule associated serine/threonine-protein kinase 1 (MAST1) inhibitor, tanespimycin, epirubicin, 5-fluorouracil and a platinum-based chemotherapy agent.

In certain embodiments, the subject is administered a combination of lestaurtinib, tanespimycin, epirubicin, 5-fluorouracil, and cisplatin. In certain embodiments, the subject is administered a combination of lestaurtinib, tanespimycin, and cisplatin.

In certain embodiments, the methods disclosed herein contemplate the subject is administered a combination of microtubule associated serine/threonine-protein kinase 1 (MAST1) inhibitor, tanespimycin, epirubicin, capecitabine, and a platinum-based chemotherapy agent. In certain embodiments, the subject is administered a combination of lestaurtinib, tanespimycin, epirubicin, capecitabine, and cisplatin.

In certain embodiments, the methods disclosed herein contemplate the subject is administered a combination of microtubule associated serine/threonine-protein kinase 1 (MAST1) inhibitor, tanespimycin, methotrexate, vincristine, doxorubicin, and a platinum-based chemotherapy agent. In certain embodiments, the subject is administered a combination of lestaurtinib, tanespimycin, methotrexate, vincristine, doxorubicin, and cisplatin.

In certain embodiments, the methods disclosed herein contemplate the subject is administered a combination of mifepristone and a platinum-based chemotherapy agent. In certain embodiments, the subject is administered a combination of mifepristone and cisplatin.

In certain embodiments, the methods disclosed herein contemplate the subject is administered a combination of mifepristone, a taxane, and a platinum-based chemotherapy agent. In certain embodiments, the taxane is paclitaxel, taxol, docetaxel, or combinations thereof. In certain embodiments, the subject is administered a combination of mifepristone, paclitaxel, and cisplatin.

In certain embodiments, the methods disclosed herein contemplate the subject is administered a combination of microtubule associated serine/threonine-protein kinase 1 (MAST1) inhibitor, mifepristone, a taxane, and a platinum-based chemotherapy agent. In certain embodiments, the taxane is paclitaxel, taxol, docetaxel, or combinations thereof. In certain embodiments, the subject is administered a combination of lestaurtinib, mifepristone, paclitaxel, and cisplatin.

In certain embodiments, the methods disclosed herein contemplate the subject is administered a combination of microtubule associated serine/threonine-protein kinase 1 (MAST1) inhibitor, mifepristone, bleomycin, etoposide, and a platinum-based chemotherapy agent.

In certain embodiments, the subject is administered a combination of lestaurtinib, mifepristone, bleomycin, etoposide, and cisplatin.

In certain embodiments, the methods disclosed herein contemplate the subject is administered a combination of microtubule associated serine/threonine-protein kinase 1 (MAST1) inhibitor, mifepristone, a taxane, and a platinum-based chemotherapy agent. In certain embodiments, the taxane is paclitaxel, taxol, docetaxel, or combinations thereof. In certain embodiments, the subject is administered a combination of lestaurtinib, mifepristone, paclitaxel, and cisplatin.

In certain embodiments, the methods disclosed herein contemplate the subject is administered a combination of microtubule associated serine/threonine-protein kinase 1 (MAST1) inhibitor, mifepristone, bleomycin, etoposide, and a platinum-based chemotherapy agent.

In certain embodiments, the subject is administered a combination of lestaurtinib, mifepristone, bleomycin, etoposide, and cisplatin.

In certain embodiments, the methods disclosed herein contemplate the subject is administered a combination of microtubule associated serine/threonine-protein kinase 1 (MAST1) inhibitor, mifepristone, epirubicin, 5-fluorouracil and a platinum-based chemotherapy agent.

In certain embodiments, the subject is administered a combination of lestaurtinib, mifepristone, epirubicin, 5-fluorouracil, and cisplatin. In certain embodiments, the subject is administered a combination of lestaurtinib, mifepristone, and cisplatin.

In certain embodiments, the methods disclosed herein contemplate the subject is administered a combination of microtubule associated serine/threonine-protein kinase 1 (MAST1) inhibitor, mifepristone, epirubicin, capecitabine, and a platinum-based chemotherapy agent. In certain embodiments, the subject is administered a combination of lestaurtinib, mifepristone, epirubicin, capecitabine, and cisplatin.

In certain embodiments, the methods disclosed herein contemplate the subject is administered a combination of microtubule associated serine/threonine-protein kinase 1 (MAST1) inhibitor, mifepristone, methotrexate, vincristine, doxorubicin, and a platinum-based chemotherapy agent. In certain embodiments, the subject is administered a combination of lestaurtinib, mifepristone, methotrexate, vincristine, doxorubicin, and cisplatin.

In certain embodiments, the cancer is selected from testicular cancer, ovarian cancer, cervical cancer, breast cancer, bladder cancer, head and neck cancer, esophageal cancer, lung cancer, mesothelioma, brain tumors and neuroblastoma. In certain embodiments, the subject is at risk of, exhibiting symptoms or diagnosed with the cancer. In certain embodiments, the cancer is skin cancer, bladder cancer, breast cancer, colon cancer, rectal cancer, endometrial cancer, kidney cancer, leukemia, liver cancer, lung cancer, melanoma, Hodgkin and non-Hodgkin lymphoma, pancreatic cancer, prostate cancer, thyroid cancer, glioblastoma, or brain cancer. In certain embodiments, the lung cancer is small cell lung cancer (SCLC) or non-small cell lung cancer (NSCLC). In certain embodiments, the lung cancer is metastatic non-small cell lung cancer (NSCLC) with BRAF V600E mutation.

In certain embodiments, administering an additional chemotherapy includes a combination of cyclophosphamide, methotrexate, 5-fluorouracil (CMF); doxorubicin, cyclophosphamide (AC); mustine, vincristine, procarbazine, prednisolone (MOPP); adriamycin, bleomycin, vinblastine, dacarbazine (ABVD); cyclophosphamide, doxorubicin, vincristine, prednisolone (CHOP); or rituximab, cyclophosphamide, doxorubicin, vincristine, prednisolone (RCHOP). In certain embodiments, the chemotherapy is anti-CTLA4 (e.g., ipilimumab, tremelimumab) antibodies and/or the anti-PD1/PD-L1 (e.g., nivolumab, pidilizumab, pembrolizumab, atezolizumab, avelumab, durvalumab) antibodies.

In certain embodiments, this disclosure relates to method for diagnosis, detection or monitoring of a platinum-based chemotherapy in a tumor resistant or sensitive subject. In certain embodiments, a biological sample and/or a control/reference sample is from a tissue or organ corresponding to the tissue or organ which is to be diagnosed, detected or monitored with respect to affection by a tumor; e.g. the tumor which is to be diagnosed, detected or monitored is lung cancer and the biological sample and/or control/reference sample is lung tissue. Such tissues and organs are described herein, for example, in connection with different tumor diseases and cancers.

Preferably, the detection and/or determination of the quantity in the methods of the disclosure comprises (i) contacting a biological sample with an agent which binds specifically to the MAST1 protein or nucleic acid which is to be detected and/or the amount of which is to be determined, and (ii) detecting the formation of and/or determining the quantity of a complex between the agent and the MAST1 protein or nucleic acid which is to be detected or the amount of which is to be determined.

Typically, the level of the MAST1 in a biological sample is compared to a reference level, wherein a deviation from said reference level is indicative of the resistant and/or sensitivity to a platinum-based chemotherapy in a subject. A "deviation" from said reference level designates any significant change, such as an increase or decrease by at least 10%, 20%, or 30%, preferably by at least 40% or 50%, or even more.

Typically, the detection and/or determination of the quantity in the methods of the disclosure involves the use of labeled ligands which specifically bind to MAST1, e.g. a labeled nucleic acid probe that hybridizes to a MAST1 nucleic acid and/or a labeled antibody or fragment/derivative thereof that specifically binds to MAST1.

According to the disclosure, detection of a nucleic acid or determining the quantity of a nucleic acid may be carried out using known nucleic acid detection methods such as methods involving hybridization or nucleic acid amplification techniques. In one embodiment, mRNA transcripts are detected, or the quantity thereof are determined, using RT-PCR or Northern blot analysis.

Pharmaceutical Compositions

In certain embodiments, this disclosure relates to pharmaceutical compositions comprising a microtubule associated serine/threonine-protein kinase (MAST) inhibitor and agents as described herein or combinations thereof and a pharmaceutically acceptable excipient.

In certain embodiments, the MAST inhibitor is lestaurtinib and the agent is dexamethasone. In certain embodiments, the MAST inhibitor is lestaurtinib and the agent is mifepristone. In certain embodiments, the MAST inhibitor is lestaurtinib and the agent is tanespimycin.

In certain embodiments, the MAST inhibitor is a MAST specific binding agent such as an antibody, small molecule compound, peptide, or siRNA.

In certain embodiments, the glucocorticoid receptor binding agent is a glucocorticoid receptor agonist or antagonist which is an antibody, small molecule compound, peptide, or siRNA.

In certain embodiments, the hsp90 binding agent is an antibody, small molecule compound, peptide, or siRNA.

In certain embodiments, the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin.

Pharmaceutical compositions typically comprise an effective amount of compounds and a suitable pharmaceutical acceptable carrier. The preparations can be prepared in a manner known per se, which usually involves mixing the compounds according to the disclosure with the one or more pharmaceutically acceptable carriers, and, if desired, in combination with other pharmaceutical active compounds, when necessary under aseptic conditions. Reference is made to U.S. Pat. Nos. 6,372,778, 6,369,086, 6,369,087 and 6,372,733 and the further references mentioned above, as well as to the standard handbooks, such as the latest edition of Remington's Pharmaceutical Sciences.

The composition comprising compound of the present disclosure can be administered to a subject either alone or as a part of a pharmaceutical composition. In certain embodiments, the pharmaceutical composition is in the form of a tablet, pill, capsule, gel, gel capsule or cream. In certain embodiments, the pharmaceutical composition is in the form of a sterilized pH buffered aqueous salt solution or a saline phosphate buffer between a pH of 6 to 8, optionally comprising a saccharide or polysaccharide.

In certain embodiments, the pharmaceutically acceptable excipient is selected from lactose, sucrose, mannitol, triethyl citrate, dextrose, cellulose, methyl cellulose, ethyl cellulose, hydroxyl propyl cellulose, hydroxypropyl methylcellulose, carboxymethylcellulose, croscarmellose sodium, polyvinyl N-pyrrolidone, crospovidone, ethyl cellulose, povidone, methyl and ethyl acrylate copolymer, polyethylene glycol, fatty acid esters of sorbitol, lauryl sulfate, gelatin, glycerin, glyceryl monooleate, silicon dioxide, titanium dioxide, talc, corn starch, carnauba wax, stearic acid, sorbic acid, magnesium stearate, calcium stearate, castor oil, mineral oil, calcium phosphate, starch, carboxymethyl ether of starch, iron oxide, triacetin, acacia gum, esters, or salts thereof.

MAST1-Induced Cisplatin-Resistant Tumor Growth Mediated by Glucocorticoid Receptor (GR) can be Inhibited by Lestaurtinib During Treatment with Cisplatin and the GR Agonist Dexamethasone Platinum-based chemotherapy are used for the treatment of a variety of human cancers including head and neck squamous cell carcinoma (HNSCC). However, it often becomes ineffective due to the development of resistance. Patients with chemotherapy-resistant cancers have an extremely poor prognosis. Thus, improved therapies are needed.

Through a RNAi screen, microtubule-associated serine/threonine kinase 1 (MAST1) was identified as a driver of cisplatin resistance in human cancers. Experiments indicate that MAST1 confers cisplatin resistance in human cancers by replacing cRaf to reactivate the MAPK pro-survival pathway. The kinase inhibitor lestaurtinib is a MAST1 inhibitor and restores cisplatin or carboplatin sensitivity.

Through transcription factor activation profiling, glucocorticoid receptor (GR), which is activated upon cisplatin exposure, was identified as a transcription factor that promotes MAST1 gene expression. GR agonists such as the synthetic steroid dexamethasone are often given to cancer patients during chemotherapy to reduce swelling, nausea, and vomiting. Treatment with dexamethasone enhanced GR activity, MAST1 expression, and cisplatin-resistant tumor growth suggesting that steroids that are given together with cisplatin can diminish the anti-cancer effect by elevating the expression of the critical cisplatin-resistant factor MAST1. Pharmacological or genetic inhibition of MAST1 dramatically diminished the effect of dexamethasone on MAST1 and consequently attenuated cisplatin-resistant tumor growth in preclinical studies. These results suggest that MAST1-induced cisplatin-resistant tumor growth mediated by GR can be inhibited by lestaurtinib during treatment with cisplatin and the GR agonist dexamethasone. Experiments indicate that using the MAST1 inhibitor lestaurtinib in combination with dexamethasone improves the efficacy of cisplatin in murine models of cancer. Although it is not intended that certain embodiments of this disclosure be limited by any particular mechanism, it is believed that MAST1 is induced by GR during cisplatin and/or dexamethasone treatment, and its inhibitor lestaurtinib improves the therapeutic efficacy of platinum-based chemotherapy while maintaining the anti-inflammatory effect of GR agonists in cancer patients.

MAST1 Gene Expression is Induced by Cisplatin

Experiments were performed to determine whether MAST1 is induced by cisplatin treatment. Cell line-based studies indicate that MAST1 is increased upon cisplatin treatment in three cancer cell lines, KB-3-1, A549, and A2780. To validate this observation in vivo, cisplatin-resistant tumors were established by treating KB-3-1 bearing mice with sub-effective doses of cisplatin. The MAST1 gene was induced in xenografted tumors after cisplatin administration in mice. Comparison of MAST1 expression between paired pre- and post-therapy tumor samples from patients with cisplatin resistant HNSCC further demonstrated that MAST1 expression is induced during treatment. Cisplatin-resistant refers to patients with tumor recurrence within two years of cisplatin or carboplatin-based chemotherapy.

Transcription Factor, GR, Promotes MAST1 Gene Expression Upon Cisplatin Treatment in Cancer Cells To understand how MAST1 is upregulated upon cisplatin exposure, transcription factor (TF) activation profiling was performed using cisplatin treated or nontreated KB-3-1 cells. The Transcription Factor Activation Profiling Array detects activities of 96 cellular TFs, including HIF1, p53, and NF-kB, which are essential in regulating cellular gene expression. Among the 96 TFs, 6 were activated more than 1.8-fold when cells were treated with cisplatin, including GR/prostaglandin (PR), NFAT, ATF2, CAR, and CBF. To investigate whether any of these TFs activate the MAST1 promoter, these 6 TFs were knocked down in KB-3-1 cells and a MAST1 promoter reporter activity assay was performed in the presence of cisplatin. Knockdown of GR but not other TFs attenuated MAST1 promoter activity. In addition, modulation of GR affected MAST1 promoter activity in the presence of cisplatin in cancer cells. Target downregulation or overexpression of GR abolished or enhanced MAST1 promoter activity in a cisplatin dose-dependent manner in KB-3-1 cells. In line with the changes seen in MAST1 mRNA, MAST1 protein level correlated with GR level in cancer cells (FIG. 3D). These data indicate that GR is a TF that activates MAST1 upon cisplatin treatment.

Chromatin immunoprecipitation (ChIP) assay showed that the MAST1 promoter interacts with GR but not PR in KB-3-1 cells and the binding between MAST1 promoter and GR increases upon treatment with cisplatin. GR binds to the glucocorticoid response element (GRE) on DNA within the promoter region and regulates genes. A GRE was identified within the MAST1 promoter sequence at −44 to −58. To confirm that GR binds to the GRE in the MAST1 promoter region and enhances MAST1 transcription, a binding-deficient mutant form of GRE was generated in MAST1 the promoter sequence by mutating 6 base pairs of the MAST1 promoter reporter construct, pMAST1-luc. Cisplatin induced WT MAST1 promoter activity. However, when the MAST1 promoter carried the binding deficient mutation in GRE or GR was target downregulated by GR shRNA, MAST1 promoter activity was dramatically decreased in cancer cells. These data indicate that cisplatin activates GR and that activated GR binds to GRE in the MAST1 promoter region to enhance MAST1 promoter activity and its transcription in cancer cells.

GR is Translocated from the Cytosol to the Nucleus by Cisplatin Treatment

To explore the molecular mechanism by which the transcription factor activity of GR is enhanced by cisplatin treatment, the intracellular location of GR in cisplatin-treated cells was investigated. GR resides predominantly in the cytoplasm as part of a heterooligomeric complex of HSP 40, 70, and 90 and other proteins. Binding to its agonist ligand changes the conformation of GR, which dissociates from the HSPs and possibly other protein factors, and translocates into the nucleus. The nuclear translocated GR is considered to be activated GR. Thus, experiment were performed to determine whether cisplatin treatment changes the cellular location of GR from the cytosol to the nucleus in cancer cells. Indeed, GR is translocated from the cytosol to the nucleus after cisplatin exposure in the KB-3-1 cancer cell line as determine by immunofluorescence staining. This observation was confirmed in vivo in xenograft mice. Administration of cisplatin resulted in nuclear translocation of GR in xenograft tumors. Furthermore, the translocation of GR was found in paired primary HNSCC patient tumors. GR was located mainly in the cytosol in tumors collected from patients before cisplatin or carboplatin therapy, whereas the GR was predominantly stained in the nucleus in tumors collected from patients after the therapy. These experiments indicate that cisplatin treatment activates GR by translocating it to the nucleus in cancer cells.

GR Signals Through MAST1-MEK1 and Provides Cisplatin Resistance to Cancer Cells

Figure 1B:
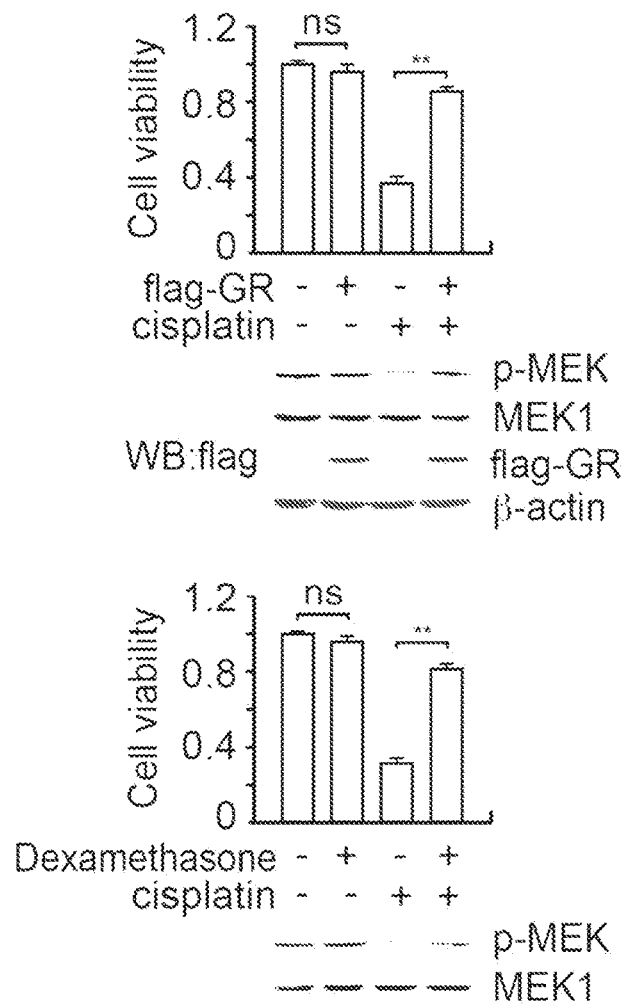
FIG. 1B shows data indicating gain of GR confers cisplatin resistance. GR was enhanced by overexpression (top) or agonist (bottom) and cell viability and MEK1 activity was measured, cisplatin: 3 µg/ml, dexamethasone: 0.5 µM.
Figure 2A:
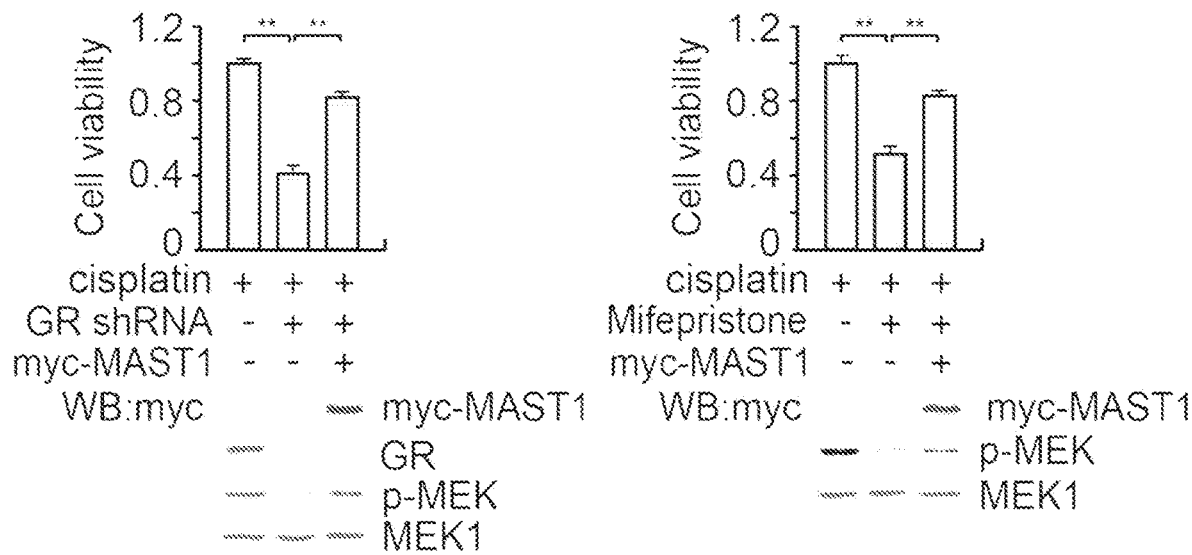
FIG. 2A shows data on the effect of MAST1 overexpression on cisR cell viability and MEK activation in KB-3-1 cells with GR knockdown (left) or GR antagonist (right).
Figure 2B:
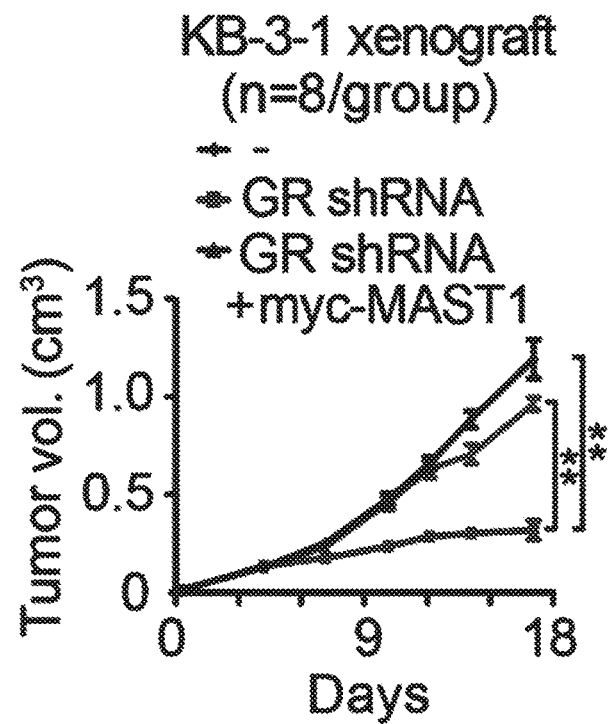
FIG. 2B shows data on the effect of MAST1 overexpression on cisR tumor growth in mice harboring KB-3-1-GR shRNA cells, cisplatin: 2 mg/kg.
Figure 2C:
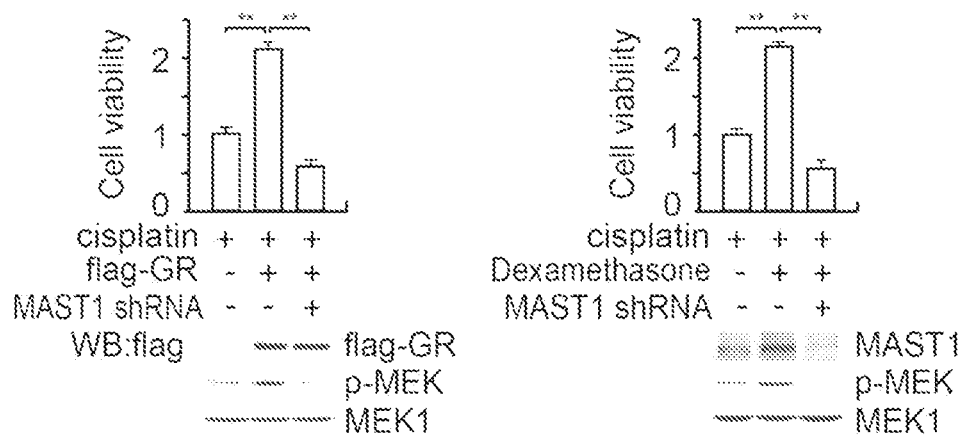
FIG. 2C shows data on the effect of MAST1 knockdown on cisR cell viability and ERK activation in KB-3-1 cells with GR overexpression (left) or GR agonist (right).
Figure 2D:
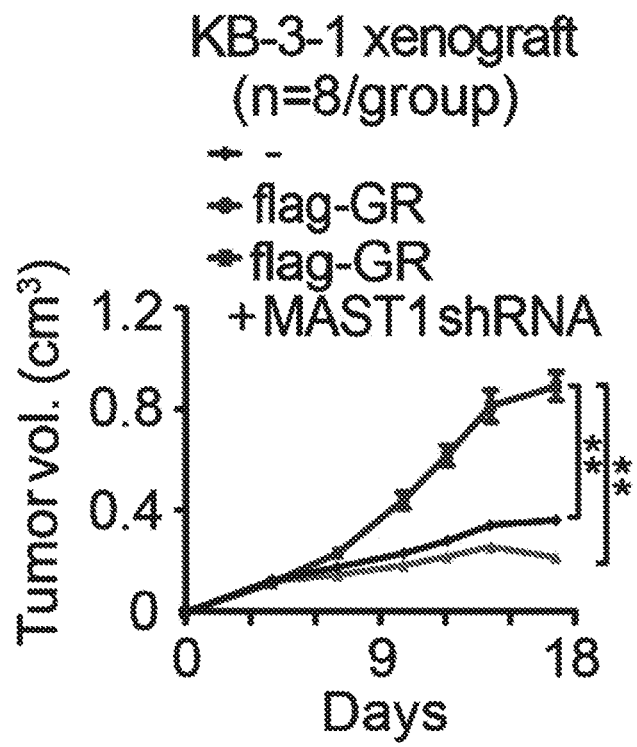
FIG. 2D shows data on the effect of MAST1 knockdown on cisR tumor growth in mice harboring KB-3-1-flag-GR cells. cisplatin: 5 mg/kg. Scale bars=50

To investigate whether GR contributes to cisplatin resistance in cancer cells, GR was genetically or pharmacologically modulated and changes in cisplatin-resistant cancer cell proliferation as well as the activity of MEK1, which is the predominant substrate of MAST1, was monitored. Inhibition of GR by shRNA or GR antagonist mifepristone sensitized cancer cells to cisplatin treatment and attenuated MEK1 activity, which was assessed by MEK1 phosphorylation at S217/S221 (FIG. 1A). In contrast, overexpression or activation of GR by exogenous expression of flag tagged GR or GR agonist dexamethasone conferred cisplatin resistance to cancer cells and resulted in reactivation of MEK1 in cancer cells (FIG. 1B). These data suggest that GR contributes to MEK1 activation and cisplatin-resistant cancer cell proliferation. To further demonstrate whether GR signals through MAST1 to reactivate MEK1 and promote cisplatin-resistant cancer cell proliferation and tumor growth, MAST1 status in cells was modified by GR knockdown or with overexpression. Exogenous overexpression of myc tagged MAST1 restored the attenuated cisplatin-resistant cell growth and MEK1 activity in KB-3-1 cells with GR inhibition either by GR shRNA or GR antagonist mifepristone (FIG. 2A). In line with the in vitro data, overexpression of MAST1 significantly and almost completely rescued the decreased tumor growth in xenograft mice bearing GR knockdown KB-3-1 cells, suggesting that GR contributes to cisplatin resistant tumor growth predominantly by signaling through MAST1 but not through other transcription targets (FIG. 2B). In contrast, reduction of MAST1 by shRNA abolished the elevated cisplatin resistant cancer cell proliferation and MEK1 activity in KB-3-1 cells with activated GR either by flag-GR overexpression or GR agonist dexamethasone (FIG. 2C). Knockdown of MAST1 dramatically attenuated cisplatin resistant tumor growth in xenograft mice bearing flag-GR stably overexpressed KB-3-1 cells (FIG. 2D). These data further suggest that GR contributes to cisplatin resistance mainly by MAST1.

Figure 3A:
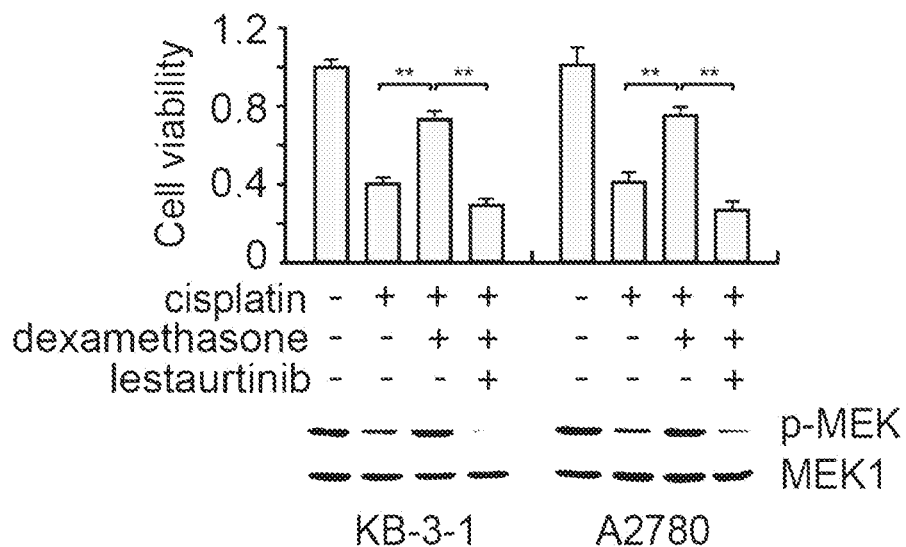
FIG. 3A shows data on the effect of lestaurtinib on dexamethasone and cisplatin-treated cancer cell growth. Cells were treated with 5 µg/ml cisplatin (cis), 500 nM dexamethasone (dex), and 100 nM lestaurtinib (les) and cell viability and MEK activity were assessed.
Figure 3B:
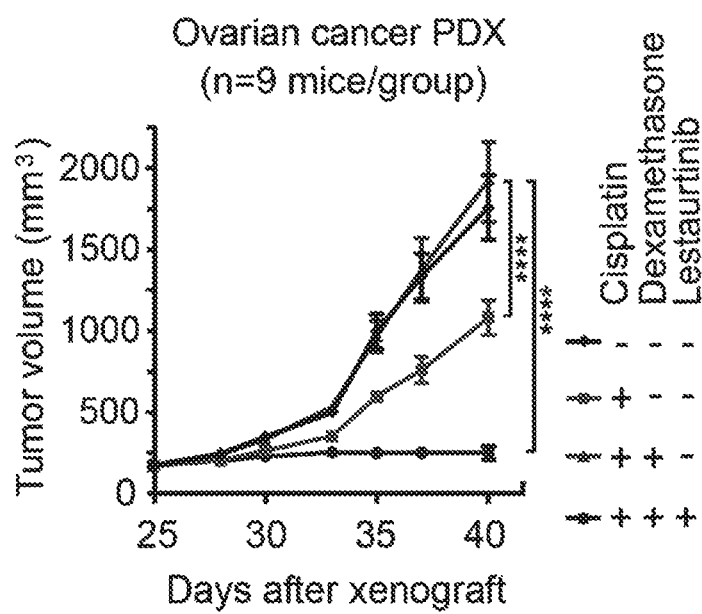
FIG. 3B shows data on ovarian cancer in PDX mice that were treated with 5 mg/kg cisplatin, 0.1 mg/kg dexamethasone twice/week, and 20 mg/kg lestaurtinib daily. Tumor volumes were measured by caliper.
Figure 3C:
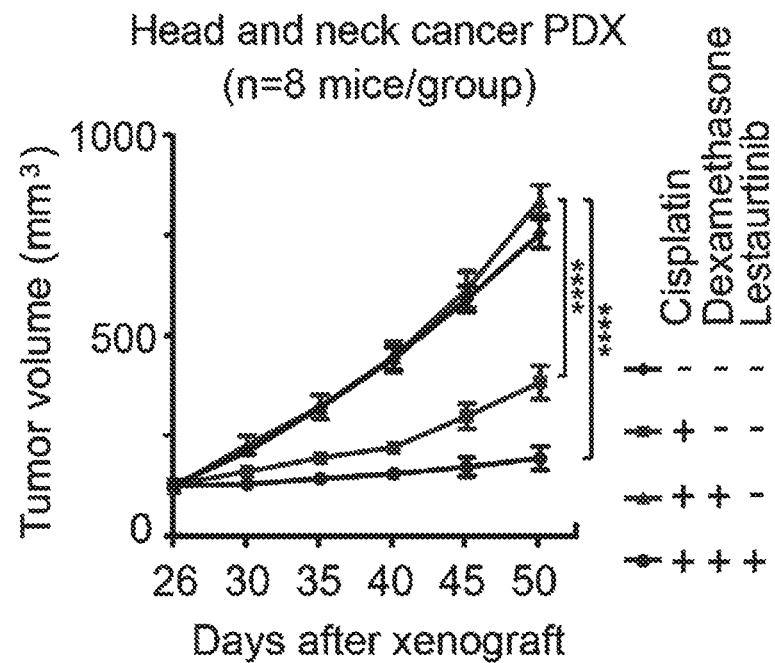
FIG. 3C shows data for head and neck cancer in PDX mice.

Inhibition of MAST1 Sensitizes Cancer Cells to Cisplatin and Masks Dexamethasone Effect on cisR Tumor Growth MAST1 inhibitors are promising anti-cancer treatments in combination with cisplatin and dexamethasone for cisplatin-resistant cancers. Therefore, we performed pilot experiments in vitro and in vivo to examine the concept. Indeed, treatment with lestaurtinib effectively attenuated dexamethasone-induced MAST1 activity and cell viability in the presence of cisplatin in KB-3-1 and A2780 cells (FIG. 3A). Moreover, dexamethasone treatment abolished the cisplatin effect in PDX mice. It is intriguing to find that treatment with lestaurtinib in combination with cisplatin in dexamethasone-treated PDX mice dramatically attenuates the tumor growth enhanced by dexamethasone treatment (FIG. 3B).

Hsp90B Enhances MAST1-Mediated Cisplatin Resistance by Protecting MAST1 from Proteosomal Degradation Through a proteomics screen, the heat shock protein 90 B (hsp90B) chaperone was identified as a direct MAST1 binding partner essential for its stabilization. Targeting hsp90B sensitized cancer cells to cisplatin predominantly through MAST1 destabilization. Interaction of hsp90B with MAST1 blocked ubiquitination of MAST1 at lysines 317 and 545 by the E3 ubiquitin ligase CHIP and prevented proteasomal degradation. The hsp90B-MAST1-CHIP signaling axis and its relationship with cisplatin response were clinically validated in cancer patients. Furthermore, combined treatment with a hsp90 inhibitor and the MAST1 inhibitor lestaurtinib further abrogated MAST1 activity and consequently enhanced cisplatin-induced tumor growth arrest in a patient-derived xenograft model. These experiments indicate the use of a combinatorial therapy to overcome cisplatin resistance in human cancers.

Hsp90B Interacts with and Stabilizes MAST1 in Cisplatin-Resistant Cancer Cells

Proteins that interact with MAST1 in cells were investigated through 2-dimensional (2D) gel electrophoresis-based proteomic profiling. GST or GST-fused MAST1 was pulled down from human 293T cells. The protein captured by GST-MAST1 but not by GST alone was excised from the 2D gel. Through mass spectrometry-based (MS-based) proteomic analysis, hsp90B was identified as a potential binding partner of MAST1. Endogenous interaction between hsp90B and MAST1 was demonstrated by coimmunoprecipitation analysis in cisplatin-resistant sublines of human carcinoma KB-3-1 and lung cancer A549 cells. Experiments were performed to determine whether the interaction is limited to the hsp90B isoform by comparing the interaction between MAST1 and hsp90B or hsp90A. Hsp90A, another isoform of hsp90, also binds to MAST1 in cisplatin-resistant cancer cells. Although hsp90A binds to MAST1 in cisplatin-resistant cancer cells, the interaction was weaker compared with hsp90B. In line with the result obtained from proteomics analysis, this indicates that hsp90B is the predominant hsp90 isoform that binds to MAST1. Experiments were performed to determine whether treatment with 17-AAG, a selective inhibitor of hsp90, alters MAST1 protein levels in cells. Interestingly, treatment with 17-AAG diminished MAST1 protein levels in a dose-dependent manner, while the same doses of 17-AAG were insufficient to decrease other known hsp90 client proteins, AKT or cRaf, in cancer cells. High dose or long duration of 17-AAG treatment eventually decreased protein levels of AKT or cRaf. However, MAST1 mRNA expression levels remained unchanged by 17-AAG treatment. Together, these data suggest that hsp90B interacts with and stabilizes MAST1 protein in cancer cells.

Hsp90B Confers Cisplatin Resistance to Cancer Cells Mainly Through MAST1 Regulation To investigate whether hsp90B contributes to cisplatin resistance through MAST1, the effect of targeting hsp90 on cisplatin resistance was examined in the presence and absence of MAST1. Treatment with the hsp90 inhibitor 17-AAG significantly sensitized cisplatin-resistant cancer cells to cisplatin, whereas the effect of 17-AAG on cisplatin resistance was abolished when MAST1 was silenced by stable gene knockdown. These in vitro observations were confirmed in vivo. 17-AAG treatment sensitized xenograft tumors to cisplatin, and MAST1 protein level was decreased, whereas the effect of 17-AAG was eradicated in mice bearing tumors with MAST1 knockdown. Moreover, the cisplatin resistance and 17-AAG effect abolished by MAST1 knockdown was restored when MAST1 was rescue-expressed in cells and in xenograft mice, further suggesting that the effect of 17-AAG on cisplatin response is mediated through MAST1. 17-AAG disrupts the function of hsp90 isoforms by binding to the ATP binding pocket. Consistent with this, surface plasmon resonance (SPR) revealed that 17-AAG binds to both hsp90A and hsp90B to alter their function. However, knockdown of hsp90B but not hsp90A abolished the role of 17-AAG in attenuating MAST1 protein level, cell viability, and cisplatin resistance. These data suggest that hsp90B but not hsp90A specifically stabilizes MAST1 protein and contributes to cisplatin-resistant cell growth in cancer cells.

Experiments were performed to determine whether overexpression of MAST1 rescues the cisplatin resistance lost by targeting hsp90B. Ectopic expression of MAST1 significantly restored the cisplatin-induced cell proliferation decrease mediated by hsp90B knockdown in cisplatin-resistant cancer cells. This was further validated in vivo in xenograft mice. The experimental mice bearing KB-3-1cisR cells with hsp90B knockdown were more sensitive to cisplatin treatment than the control group carrying xenograft tumors with hsp90B. However, overexpression of myc-MAST1 partially but significantly restored the decreased tumor growth and proliferation in vivo. Both loss- and gain-of-function approaches suggest that hsp90B contributes to cisplatin resistance in cancer cells mainly by regulating MAST1 protein.

Hsp90 Impedes Ubiquitination of MAST1 at Lysine 317/545 and Protects MAST1 from Proteasomal Degradation The ubiquitination status of MAST1 in the presence and absence of hsp90 was assessed. Inhibition of hsp90 resulted in MAST1 ubiquitination and degradation, whereas treatment with proteasome inhibitor MG-132 prevented 17-AAG-mediated MAST1 degradation in 293T cells. This was further confirmed in cisplatin-resistant cancer cells. Although longer duration or higher dose of 17-AAG treatment eventually decreased protein levels of AKT or cRaf, treatment with 17-AAG induced degradation of MAST1 while the same duration and dose of 17-AAG did not alter the levels of AKT or cRaf in cisplatin-resistant cancer cells. MG-132 treatment increased MAST1 and eventually AKT and cRaf protein levels at a longer time point. This suggests that these proteins are degraded by the proteasome, but that MAST1 is more susceptible to hsp90 or proteasome inhibition than other client proteins, AKT and cRaf, in cells. Furthermore, treatment with the proteasome inhibitor MG-132 led to MAST1 ubiquitination, which was further enhanced by hsp90 inhibition. These results suggest that MAST1 undergoes ubiquitin-mediated proteasomal degradation when hsp90 is functionally abrogated.

Through a MS-based proteomic analysis, it was identified that MAST1 is specifically ubiquitinated at lysine residues K317 and K545 upon hsp90 inhibition. To investigate whether these 2 residues are the main ubiquitination sites of MAST1 that mediate proteasomal degradation upon hsp90 inhibition, the lysine-to-arginine mutant forms of MAST1, K317R, K545R, and the double KR mutant K317R/K545R (2KR) were generated. Mutation at either single ubiquitination site did not alter the ubiquitination level of MAST1. However, simultaneous mutation at both K317 and K545 resulted in decreased ubiquitination. Moreover, wild-type (WT) MAST1 was degraded upon 17-AAG treatment in a dose-dependent manner, whereas 2KR MAST1 remained intact. These data indicate that K317 and K545 are the key ubiquitination sites in MAST1 and that ubiquitination of both residues leads to proteasomal degradation when functional hsp90 is absent.

Hsp90 Supports Cisplatin-Resistant Tumor Growth Through Stabilizing MAST1 and Preventing its Ubiquitination at K317 and K545

Figure 4:
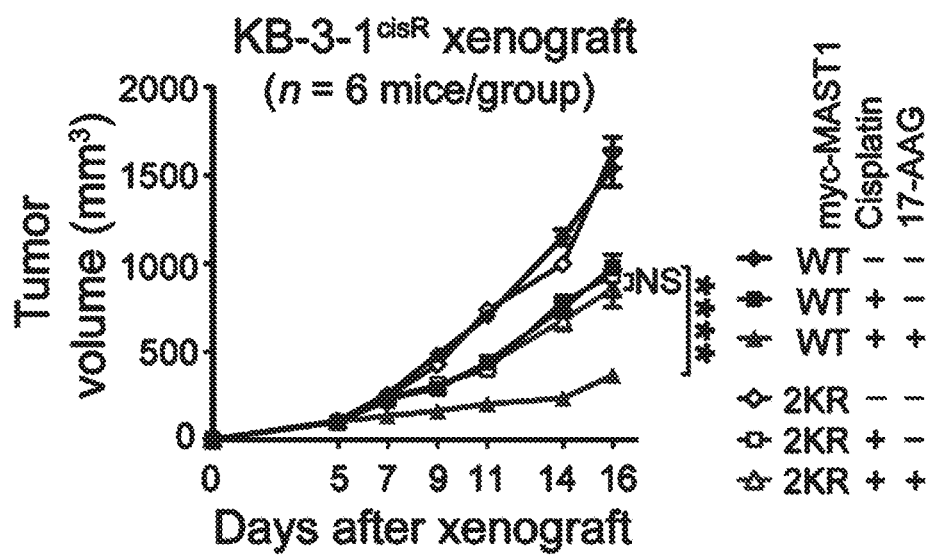
FIG. 4 shows data on the effect of 17-AAG and cisplatin treatment on tumor volume and tumor weight of xenograft mice bearing KB-3-1cisR with MAST1 WT or 2KR overexpression. Mice were treated with cisplatin (5 mg/kg) and 17-AAG (50 mg/kg) from 5 days after xenograft.

Experiments were performed to determine whether ubiquitination of MAST1 at K317 and K545 upon hsp90 inhibition is involved in MAST1-mediated cisplatin-resistant cancer cell proliferation and tumor growth. Treatment with 17-AAG decreased the level of MAST1 and attenuated activity of the downstream substrate MEK1, whereas 2KR MAST1 did not respond to 17-AAG in terms of MAST1 level or MEK1 activity. Mutation of K317 and K545 to arginine in MAST1 did not affect its kinase activity in an in vitro MAST1 kinase assay, suggesting that the decreased MEK1 activity upon MAST1 2KR expression is not a consequence of a change in direct kinase activity. The effect of MAST1 WT or 2KR was monitored in cells with MAST1 knockdown. These cells showed similar MAST1 activity and cisplatin response compared with cells harboring endogenous MAST1. While cisplatin-resistant cells expressing MAST1 WT were sensitive to 17-AAG treatment in the presence of cisplatin, expression of MAST1 2KR led the cells to become resistant to 17-AAG treatment, resulting in no significant decrease in cell viability and cisplatin resistance. This finding was further validated in vivo. While the mice bearing MAST1 WT xenograft tumors responded to 17-AAG treatment, as demonstrated by attenuated tumor growth upon cisplatin exposure and decreased MAST1 levels and MEK1 phosphorylation, the mice bearing MAST1 2KR tumors were resistant to these effects of 17-AAG treatment (FIG. 4). These data suggest that hsp90 contributes to cisplatin-resistant tumor growth by protecting MAST1 from being ubiquitinated at K315 and K545.

CHIP Ubiquitinates MAST1 at K317/K545 and Mediates MAST1 Degradation

An E3 ubiquitin ligase, CHIP, was identified as a potential binding partner of MAST1. Endogenous and exogenous protein interaction between CHIP, MAST1, and hsp90 was confirmed by coimmunoprecipitation in cisplatin-resistant cancer cells. To examine whether CHIP is involved in MAST1 degradation, the level of CHIP was modified and any changes in MAST1 protein levels in cisplatin-resistant cancer cells were monitored. CHIP overexpression reduced the level of MAST1 and conversely, knockout of CHIP resulted in enhanced MAST1 levels in cisplatin-resistant cancer cells. However, CHIP modulation did not alter hsp90B levels, suggesting that the effect of CHIP is specific for MAST1. In addition, CHIP modulation consequently altered MEK and ERK phosphorylation levels when the cells were treated with cisplatin.

Degradation of MAST1 by CHIP was examined by the cycloheximide chase assay. Overexpression of CHIP promoted degradation of MAST1, whereas inhibition of CHIP by genetic knockdown or CHIP H260Q, a mutant lacking ubiquitin ligase activity, lessened the degradation of MAST1. These data suggest that CHIP could be a potential negative regulator of MAST1 that induces MAST1 ubiquitination and degradation. Indeed, in vitro and in vivo CHIP ubiquitination assays revealed that CHIP directly mediates the ubiquitination of MAST1 at K317 and K545 in cancer cells.

Experiments were performed to determine whether CHIP signals through MAST1 and contributes to MAST1-mediated cisplatin resistance in cancer cells. Overexpression of CHIP decreased MAST1 levels and sensitized cisplatin-resistant cancer cells to cisplatin, while MAST1 knockdown abolished and rescue expression of MAST1 WT restored the effect of CHIP on cisplatin resistance. Moreover, expression of MAST1 2KR prevented MAST1 from being degraded and resulted in increased cisplatin resistance regardless of CHIP expression. Overall, these data indicate that CHIP contributes to cisplatin resistance predominantly by inducing destabilization of MAST1 through ubiquitination at K317 and K545.

Expression of hsp90B Positively and CHIP Negatively Correlates with MAST1 Protein Level and Cisplatin Resistance in Cancer Patients Immunohistochemistry (IHC) staining to was performed explore the correlation between hsp90B, CHIP, and MAST1 protein expression levels and cisplatin response in 76 tumor samples collected from head and neck squamous cell carcinoma (HNSCC) patients who received platinum-based (cisplatin or carboplatin) chemotherapy. Hsp90B expression levels were significantly higher in the tumors collected from patients with cisplatin-resistant disease that recurred within 2 years of therapy compared with samples from patients with cisplatin-sensitive tumors who showed no evidence of disease for more than 2 years after platinum-based chemotherapy. In contrast, CHIP expression levels were higher in tumors collected from the cisplatin-sensitive patient group than in tumors from the cisplatin-resistant patient group. Furthermore, MAST1 protein expression positively correlated with hsp90B protein levels with an r value of 0.6065, whereas a negative correlation between MAST1 and CHIP protein levels (r=−0.4433) was observed in the same HNSCC tumors from patients who received platinum-based chemotherapy. Collectively, these data clinically validate our findings and support a functional relationship between hsp90B, CHIP, and MAST1 in cisplatin response of human cancers.

Figure 5A:
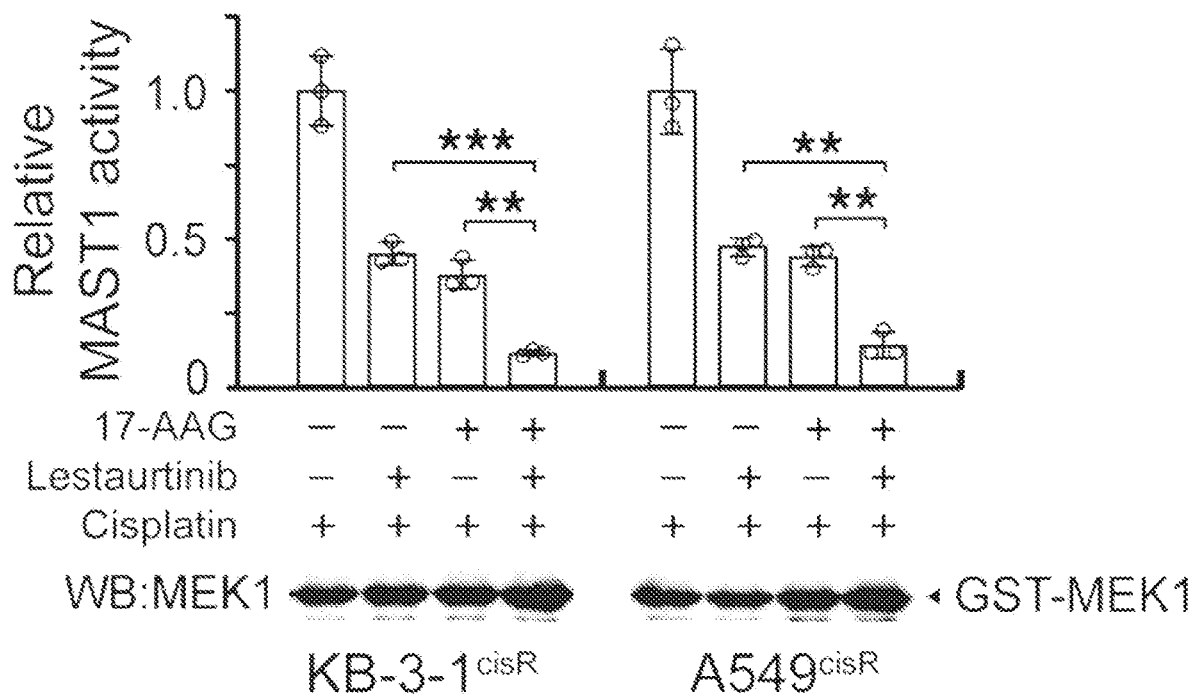
FIG. 5A shows cell viability data indicating the combination of 17-AAG and lestaurtinib further inhibits MAST1 activity and cisplatin-resistant tumor growth. Combination effect of 7-AAG and lestaurtinib on expression and activity of MAST1. KB-3-1cisR and A549cisR cells were treated with 17-AAG (100 nM) and lestaurtinib (100 nM) in the presence of sublethal doses of cisplatin for 24 hours.
Figure 5B:
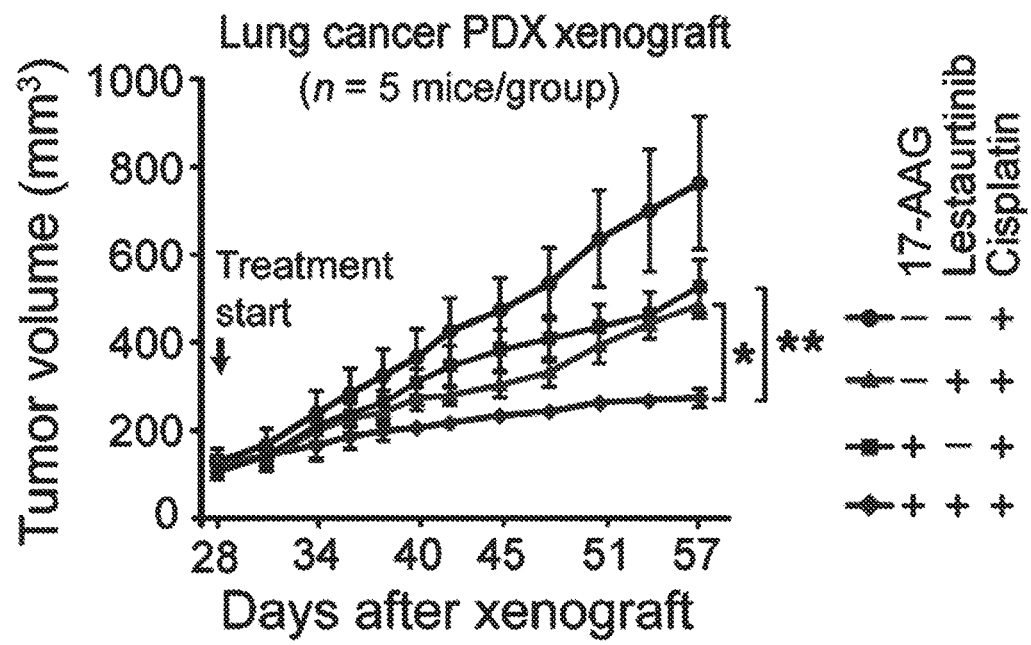
FIG. 5B shows data on the effect of cisplatin treatment with the combination of 17-AAG and lestaurtinib on tumor growth of lung cancer PDX mice. Mice were administered 17-AAG, lestaurtinib, and cisplatin from 28 days after xenograft.

Combinatorial Targeting of MAST1 and Hsp90 Further Inhibits MAST1 and Sensitizes Tumor Cells to Cisplatin Treatment Studies of the molecular mechanism underlying hsp90B-mediated MAST1 regulation in cisplatin resistance of human cancers indicate a combinatorial therapeutic strategy which could further improve MAST1-based therapy in patients with cisplatin-resistant tumors. Lestaurtinib is a MAST1 inhibitor. Hsp90 inhibitors are currently being actively pursued in clinical trials. Experiments were performed to determine whether combined treatment with 17-AAG and lestaurtinib could further improve cisplatin response in vitro and in vivo by attenuating MAST1 activity. Treatment with 17-AAG and lestaurtinib further attenuated the ability of MAST1 to reactivate MEK1 by decreasing both MAST1 protein level and inhibiting its kinase activity in cisplatin-resistant cancer cells (FIG. 5A). The combinatorial targeting of hsp90 and MAST1 by 17-AAG and lestaurtinib synergistically decreased cell viability of diverse cisplatin-resistant cancer cell lines with the combination index (CI) of 0.443-0.764 and further sensitized the cells to cisplatin. The combined effect of 17-AAG and lestaurtinib was examined in a patient-derived xenograft (PDX) model of lung cancer. Supporting the results obtained in vitro, administration of 17-AAG in combination with lestaurtinib enhanced the effects of cisplatin in PDX mice by significantly decreasing the tumor growth and tumor proliferation with minimum toxicity (FIG. 5B). The significant tumor growth decrease was accompanied by attenuated MAST1 activity in PDX tumors, which was assessed by MEK1 S217/S221 phosphorylation and ADP-Glo MAST1 kinase assay using inactive recombinant MEK1 as a substrate. These data suggest that combinatorial therapy with 17-AAG and lestaurtinib may further be effective in overcoming cancer cisplatin resistance by targeting both the protein regulatory system and the enzyme activity of MAST1.

What is claimed is:

1. A method of treating lung cancer comprising administering an effective amount of a platinum-based chemotherapy agent in combination with tanespimycin and lestaurtinib to a subject in need thereof.

2. The method of claim 1, wherein the platinum-based chemotherapy agent is selected from cisplatin, carboplatin, oxaliplatin, phenanthriplatin, nedaplatin, triplatin tetranitrate, picoplatin, pyriplatin, lipoplatin, and satraplatin.

3. A pharmaceutical compositions comprising lestaurtinib, tanespimycin, and a pharmaceutically acceptable excipient.

4. The pharmaceutical composition of claim 3 in the form of a tablet, pill, capsule, gel, gel capsule, or cream.

5. The pharmaceutical composition of claim 3 in the form of a sterilized pH buffered aqueous salt solution or a saline phosphate buffer between a pH of 6 to 8, optionally comprising a saccharide or polysaccharide.

6. The pharmaceutical composition of claim 3, wherein the pharmaceutically acceptable excipient is selected from lactose, sucrose, mannitol, triethyl citrate, and dextrose.

7. The pharmaceutical composition of claim 3, wherein the pharmaceutically acceptable excipient is selected from cellulose, methyl cellulose, ethyl cellulose, hydroxyl propyl cellulose, hydroxypropyl methylcellulose, carboxymethylcellulose, croscarmellose sodium, polyvinyl N-pyrrolidone, crospovidone, ethyl cellulose, povidone, and a methyl and ethyl acrylate copolymer.

8. The pharmaceutical composition of claim 3, wherein the pharmaceutically acceptable excipient is polyethylene glycol.

9. The pharmaceutical composition of claim 3, wherein the pharmaceutically acceptable excipient is selected from fatty acid esters of sorbitol, lauryl sulfate, gelatin, glycerin, glyceryl monooleate, and triacetin.

10. The pharmaceutical composition of claim 3, wherein the pharmaceutically acceptable excipient is selected from silicon dioxide, iron oxide, and titanium dioxide.

11. The pharmaceutical composition of claim 3, wherein the pharmaceutically acceptable excipient is selected from talc, starch, corn starch, and carboxymethyl ether of starch.

12. The pharmaceutical composition of claim 3, wherein the pharmaceutically acceptable excipient is selected from stearic acid, sorbic acid, magnesium stearate, and calcium stearate.

13. The pharmaceutical composition of claim 3, wherein the pharmaceutically acceptable excipient is selected from castor oil and mineral oil.

14. The pharmaceutical composition of claim 3, wherein the pharmaceutically acceptable excipient is calcium phosphate.

15. The pharmaceutical composition of claim 3, wherein the pharmaceutically acceptable excipient is carnauba wax.

16. The pharmaceutical composition of claim 3, wherein the pharmaceutically acceptable excipient is acacia gum.

* * * * *